(12) United States Patent
Lee

(10) Patent No.: US 11,638,009 B2
(45) Date of Patent: *Apr. 25, 2023

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,751

(22) Filed: May 26, 2021

(65) Prior Publication Data

US 2021/0281848 A1 Sep. 9, 2021

Related U.S. Application Data

(62) Division of application No. 16/488,577, filed as application No. PCT/KR2018/002343 on Feb. 26, 2018, now Pat. No. 11,051,023.

(30) Foreign Application Priority Data

Feb. 24, 2017 (KR) .......................... 10-2017-0024643
Feb. 24, 2017 (KR) .......................... 10-2017-0024644

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/176* (2014.11); *H04N 19/30* (2014.11)

(58) Field of Classification Search
USPC ..................................................... 375/240.02
See application file for complete search history.

(56) References Cited

U.S. PATENT DOCUMENTS 9,930,358 B2 3/2018 Kim et al.
10,869,065 B2 * 12/2020 Lee ...................... H04N 19/119
(Continued)

FOREIGN PATENT DOCUMENTS

CN 101123728 A 2/2008
CN 103229504 A 7/2013
(Continued)

OTHER PUBLICATIONS

Benjamin Bross et al., "WD4: Working Draft 4 of High-Efficiency Video Coding", Document: JCTVC-F803_d5, Joint Collaborative Team on Video Coding (JCT-VC) of ITU-T SG16 WP3 and ISO/IEC JTC1/SC29/WG11 6th Meeting: Torino, IT, Jul. 14-22, 2011.
(Continued)

*Primary Examiner* — Behrooz M Senfi
(74) *Attorney, Agent, or Firm* — IP Legal Services, LLC

(57) ABSTRACT

The present invention is related to processing a video signal. A method for decoding a video according to the present invention may comprise checking a merge coding unit which is generated by merging a plurality of coding units neighboring each other based on an encoded syntax element, and decoding the checked merge coding unit, wherein a same motion vector is shared in the merge coding unit.

9 Claims, 29 Drawing Sheets

(51) Int. Cl.
*H04N 19/176* (2014.01)
*H04N 19/30* (2014.01)

(56) References Cited

U.S. PATENT DOCUMENTS

| | | | |
|---|---|---|---|
| 10,904,581 B2* | 1/2021 | Lee | H04N 19/46 |
| 11,350,137 B2* | 5/2022 | Lee | H04N 19/96 |
| 11,356,710 B2* | 6/2022 | Lee | H04N 19/176 |
| 2008/0036916 A1 | 2/2008 | Sakamoto | |
| 2008/0175322 A1 | 7/2008 | Lee et al. | |
| 2012/0008688 A1 | 1/2012 | Tsai et al. | |
| 2012/0128060 A1 | 5/2012 | Lin et al. | |
| 2012/0134415 A1 | 5/2012 | Lin et al. | |
| 2012/0134416 A1 | 5/2012 | Lin et al. | |
| 2012/0207220 A1 | 8/2012 | Kim et al. | |
| 2012/0224635 A1 | 9/2012 | Kim et al. | |
| 2012/0236941 A1 | 9/2012 | Lin et al. | |
| 2012/0236942 A1 | 9/2012 | Lin et al. | |
| 2012/0275522 A1 | 11/2012 | Kim et al. | |
| 2012/0314771 A1 | 12/2012 | Lim et al. | |
| 2012/0320981 A1 | 12/2012 | Shimada et al. | |
| 2013/0208804 A1 | 8/2013 | Lin et al. | |
| 2013/0243098 A1 | 9/2013 | Lin et al. | |
| 2014/0226725 A1 | 8/2014 | Lin et al. | |
| 2015/0131733 A1 | 5/2015 | Kim et al. | |
| 2015/0189312 A1 | 7/2015 | Shimada et al. | |
| 2015/0189313 A1 | 7/2015 | Shimada et al. | |
| 2015/0195525 A1 | 7/2015 | Sullivan et al. | |
| 2015/0195557 A1 | 7/2015 | Silkin et al. | |
| 2015/0208085 A1 | 7/2015 | Shimada et al. | |
| 2015/0326876 A1 | 11/2015 | Tsai et al. | |
| 2016/0014408 A1 | 1/2016 | Shimada et al. | |
| 2016/0173872 A1 | 6/2016 | Lin et al. | |
| 2016/0173905 A1 | 6/2016 | Lin et al. | |
| 2016/0205410 A1 | 7/2016 | Lin et al. | |
| 2017/0078699 A1 | 3/2017 | Park et al. | |
| 2017/0155921 A1 | 6/2017 | Lin et al. | |
| 2017/0339426 A1 | 11/2017 | Lee et al. | |
| 2017/0359587 A1 | 12/2017 | Sullivan et al. | |
| 2018/0131947 A1 | 5/2018 | Sullivan et al. | |
| 2018/0139453 A1* | 5/2018 | Park | H04N 19/159 |
| 2018/0176596 A1 | 6/2018 | Jeong et al. | |
| 2018/0199052 A1 | 7/2018 | He | |
| 2019/0320195 A1 | 10/2019 | Lim et al. | |
| 2019/0342578 A1 | 11/2019 | Lee | |
| 2020/0099928 A1 | 3/2020 | Piao et al. | |
| 2020/0128238 A1 | 4/2020 | Lee | |

FOREIGN PATENT DOCUMENTS

| | | |
|---|---|---|
| CN | 104539963 A | 4/2015 |
| KR | 10-2016-0106703 A | 9/2016 |
| KR | 10-2016-0132859 A | 11/2016 |
| WO | 2011/052897 A2 | 5/2011 |

OTHER PUBLICATIONS

China National Intellectual Property Administration, Office Action of corresponding CN Patent Application No. 201880026911.8, dated Nov. 21, 2022.

* cited by examiner

CU

2N×2N

PU

PART_2N×2N   PART_N×2N   PART_2N×N   PART_N×N

PART_nL×2N   PART_nR×2N   PART_2N×nU   PART_2N×nD

METHOD AND APPARATUS FOR PROCESSING VIDEO SIGNAL

CROSS REFERENCE TO RELATED APPLICATIONS

This application is a Divisional of U.S. patent application Ser. No. 16/488,577 (filed on Aug. 23, 2019), which is a National Stage Patent Application of PCT International Patent Application No. PCT/KR2018/002343 (filed on Feb. 26, 2018) under 35 U.S.C. § 371, which claims priority to Korean Patent Application Nos. 10-2017-0024643 (filed on Feb. 24, 2017), and 10-2017-0024644 (filed on Feb. 24, 2017), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for multi-tree partitioning which can be used partitioning an encoding/decoding target block efficiently in encoding/decoding video signal.

An object of the present invention is to provide a method and an apparatus for multi-tree partitioning for partitioning an encoding/decoding target block into symmetric blocks or asymmetric blocks in encoding/decoding video signal.

An object of the present invention is to provide a method and an apparatus for generating a merge coding block corresponding to a coding block partitioned by multi-tree partitioning.

An object of the present invention is to provide a method and an apparatus for determining a representative motion vector by utilizing a motion vector precision.

An object of the present invention is to provide a recording medium including a video signal bitstream encoded by various encoding methods.

The technical objects to be achieved by the present invention are not limited to the above-mentioned technical problems. And, other technical problems that are not mentioned will be apparently understood to those skilled in the art from the following description.

Technical Solution

A method for decoding a video signal according to the present invention comprises checking a merge coding unit which is generated by merging a plurality of coding units neighboring each other based on an encoded syntax element, and decoding the checked merge coding unit, wherein a same motion vector is shared in the merge coding unit.

In addition, a motion vector applied to the merge coding unit is determined by utilizing the encoded syntax element.

In addition, a first coding unit in a coding order among the plurality of coding units is determined as a merge candidate coding unit, and a motion vector of the determined merge candidate coding unit is applied as a motion vector of the merge coding unit.

In addition, the encoded syntax element comprises a first syntax element (CU_merge_flag) indicating whether there exists a merge between coding units, and a second syntax element (CU_merge_idx) defining a shape of the merge coding unit when the merge is occurred by the first syntax element.

In addition, the second syntax element (CU_merge_idx) indicates whether first two coding units in a coding order are merged or whether last two coding units in a coding order are merged among three coding units to which triple tree partitioning is applied.

In addition, the second syntax element (CU_merge_idx) indicates whether a first coding unit and a second coding unit in a coding order are merged, a third coding unit and a four coding unit in a coding order are merged, whether a first coding unit and a third coding unit in a coding order are merged, or whether a second coding unit and a fourth coding unit in a coding order are merged among four coding units to which quad tree partitioning is applied.

In addition, partition types of a coding unit are distinguished by using the first syntax element (CU_merge_flag) and the second syntax element (CU_merge_idx).

In addition, a same cordword is applied to partitioning types of a coding unit distinguished by the first syntax element (CU_merge_flag) and the second syntax element (CU_merge_idx).

A method for decoding a video signal according to the present invention comprises determining a representative motion vector for a upper coding block including a plurality of lower coding blocks, deriving a motion vector of a current coding block by utilizing the determined representative motion vector as a temporal motion vector candidate of the current coding block who refer to the upper coding block, and performing motion compensation of the current coding block using the motion vector of the current coding block.

In addition, the representative motion vector representing the upper coding block is determined by utilizing motion vector precisions of the lower coding blocks.

In addition, the representative motion vector representing the upper coding block is determined to be a motion vector having a most accurate motion vector precision among motion vectors of the lower coding blocks.

In addition, the representative motion vector representing the upper coding block is determined to be a motion vector having a least accurate motion vector precision among motion vectors of the lower coding blocks.

In addition, the representative motion vector representing the upper coding block is determined based on positions of the lower coding blocks.

In addition, the representative motion vector representing the upper coding block is determined to be a motion vector of a codding block including a top left sample among the lower coding blocks.

A method for encoding a video signal according to the present invention comprises generating a merge coding unit by merging a plurality of coding units neighboring each other, encoding the generated merge coding unit, and signaling a syntax element relating to the merge coding unit, wherein a same motion vector is shared in the merge coding unit.

In addition, the signaled syntax element comprises a first syntax element (CU_merge_flag) indicating where there exists a merge between coding units, and a second syntax element (CU_merge_idx) defining a shape of the merge coding unit when the merge is occurred by the first syntax element.

A method for encoding a video signal according to the present invention comprises determining a representative motion vector for an upper coding block including a plurality of lower coding blocks, deriving a motion vector of a current coding block by utilizing the determined representative motion vector as a temporal motion vector candidate of the current coding block who refer to the upper coding block, and performing motion compensation of the current coding block using the motion vector of the current coding block.

An apparatus for decoding a video signal according to the present invention comprises a decoding unit to check a merge coding unit generated by merging a plurality of coding units neighboring each other based on an encoded syntax element, and decode the checked mere coding unit, wherein a same motion vector is shared in the merge coding unit.

An apparatus for decoding a video signal according to the present invention comprises a decoding unit to determine a representative motion vector for a upper coding block including a plurality of lower coding blocks, to derive a motion vector of a current coding block by utilizing the determined representative motion vector as a temporal motion vector candidate of the current coding block who refer to the upper coding block, and to perform motion compensation of the current coding block using the motion vector of the current coding block.

A recoding medium comprising a video signal bitstream, the video signal bitstream included in the recoding medium is encoded by a encoding method comprising generating a merge coding unit by merging a plurality of coding units neighboring each other, encoding the generated merge coding unit, and signaling a syntax element relating to the merge coding unit, wherein a same motion vector is shared in the merge coding unit.

A recoding medium comprising a video signal bitstream, the video signal bitstream included in the recoding medium is encoded by a encoding method comprising determining a representative motion vector for a upper coding block including a plurality of lower coding blocks, deriving a motion vector of a current coding block by utilizing the determined representative motion vector as a temporal motion vector candidate of the current coding block who refer to the upper coding block, and performing motion compensation of the current coding block using the motion vector of the current coding block.

The features briefly summarized above for the present invention are only illustrative aspects of the detailed description of the invention that follows, but do not limit the scope of the invention.

Advantageous Effects

According to the present invention, encoding/decoding efficiency of video signal is improved by partitioning an encoding/decoding target block efficiently.

According to the present invention, encoding/decoding efficiency of video signal is enhanced by partitioning an encoding/decoding target block into symmetric or asymmetric blocks.

According to the present invention, encoding/decoding efficiency of video signal partitioned by multi-tree partitioning is enhanced by generating a merge coding unit.

According to the present invention, encoding/decoding efficiency of video signal is enhanced since a motion vector can be expressed by various precisions and a representative motion vector can be determined by utilizing them.

The effects obtainable by the present invention are not limited to the above-mentioned effects, and other effects not mentioned can be clearly understood by those skilled in the art from the description below.

MODE FOR INVENTION

Figure 1:
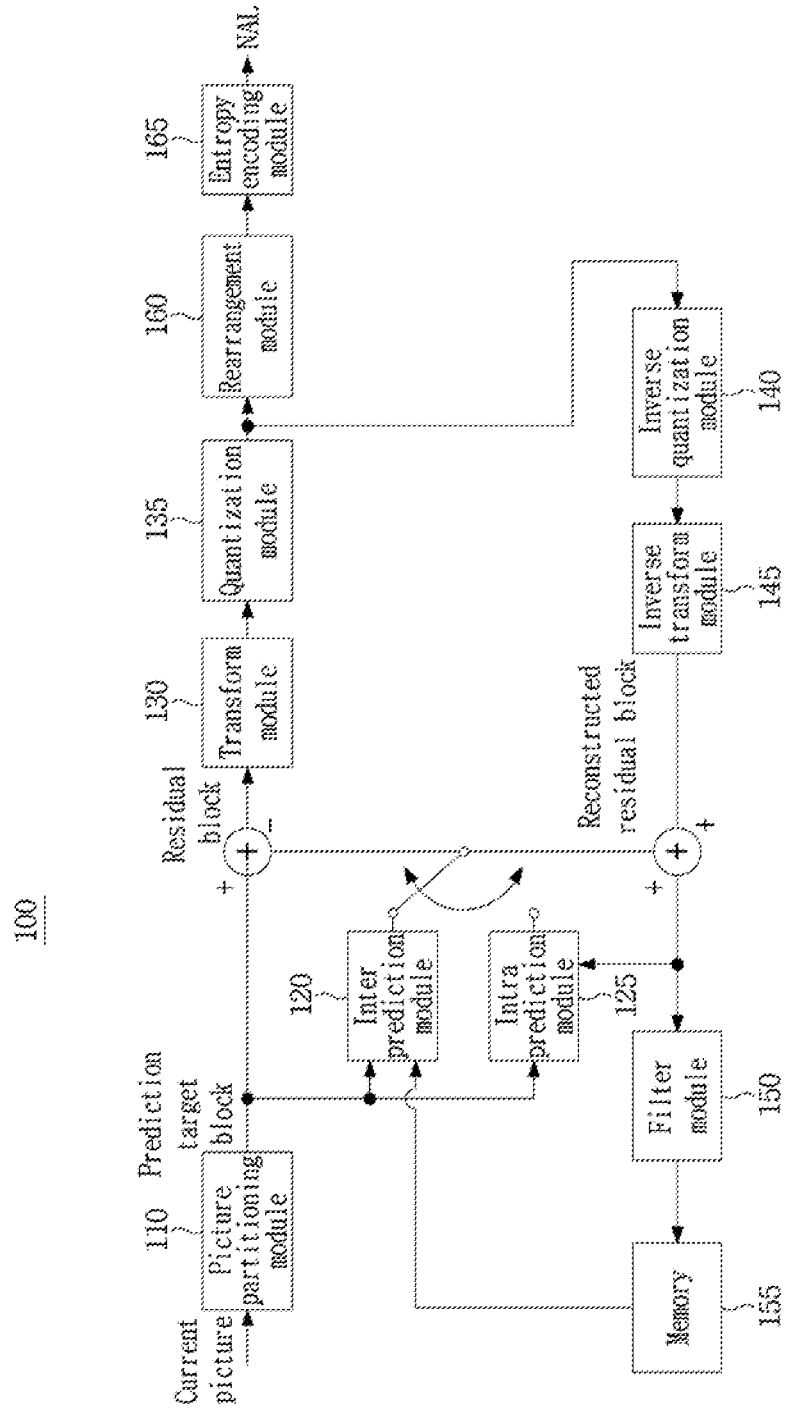
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

In addition, a term "unit" used in the present application may be replaced by a "block", and thus, in the present specification, each term in a pair of "coding tree unit" and "coding tree block", "coding unit" and "coding block", "prediction unit" and "prediction block", and "transform unit" and "transform block" may be interpreted to have the same meaning.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
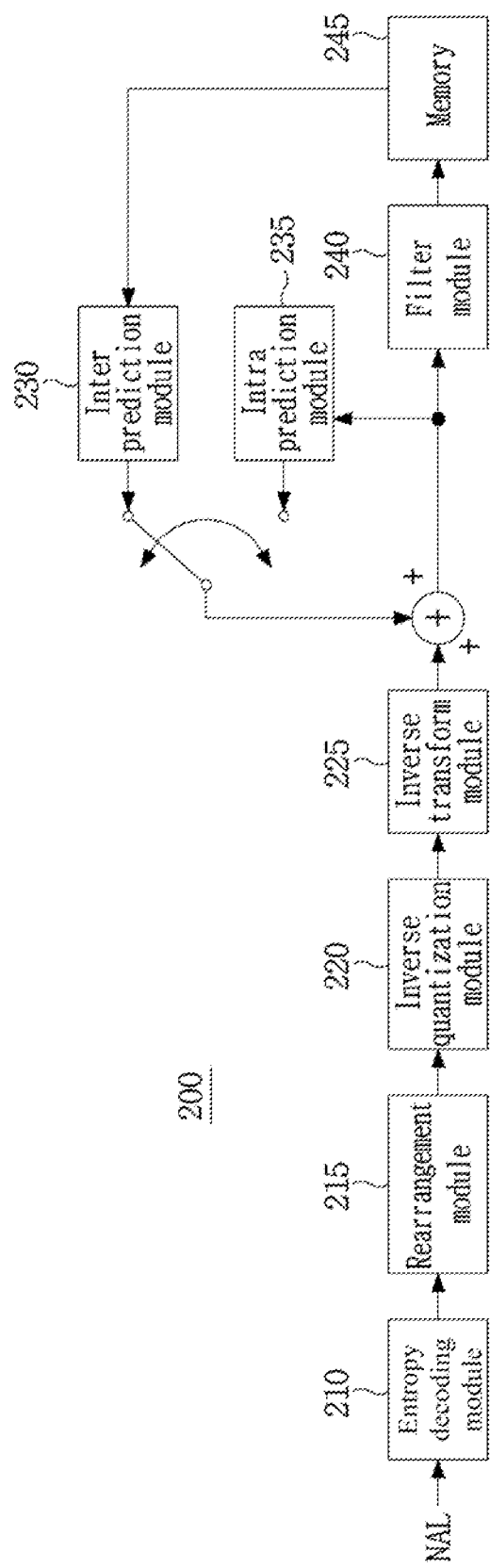
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step. In this specification, a term 'unit' may represent a basic unit for performing a specific encoding/decoding process, and a term 'block' may represent sample arrays of a predetermined size. If there is no distinction between them, the terms 'block' and 'unit' may be used to have equivalent meanings. For example, in the embodiments described below, it can be understood that a coding block and a coding unit have mutually equivalent meanings.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

Figure 3A:
FIGS. 3A and 3B are diagrams illustrating a partition mode that can be applied to a coding block
Figure 3B:
Figure 3B:
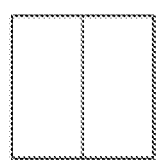
Figure 3B:
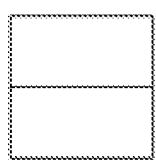
Figure 3B:
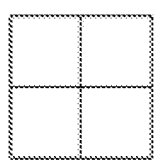
Figure 3B:
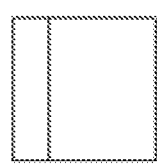
Figure 3B:
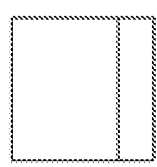
Figure 3B:
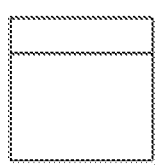
Figure 3B:
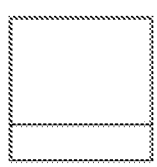

FIGS. 3A and 3B are diagrams illustrating a partition mode that can be applied to a coding block when the coding block is encoded by intra prediction or inter prediction. A partition of arbitrary size generated by dividing a coding tree unit may be defined as a coding unit. For example, it is illustrated in FIG. 3A a coding unit of 2N×2N size. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit (TU) or a prediction unit (PU), which is a base unit for performing prediction, quantization, transform or in-loop filtering and the like.

Alternatively, if a coding block is determined, a prediction block having the same size as the coding block or smaller than the coding block may be determined through predictive partitioning of the coding block. Predictive partitioning of the coding block can be performed by a partition mode (Part_mode) indicating a partition type of the coding block. A size or shape of the prediction block may be determined according to the partition mode of the coding block. The partition type of the coding block may be determined through information specifying any one of partition candidates. At this time, the partition candidates available to the coding block may include an asymmetric partition type (for example, nL×2N, nR×2N, 2N×nU, 2N×nD) depending on a size, a shape, an encoding mode or the like of the coding block. For example, the partition candidates available to the coding block may be determined according to the encoding mode of the current block. For example, when the coding block is encoded by inter prediction, one of 8 partition modes may be applied to the coding block, as in the example shown in FIG. 3B. On the other hand, when the coding block is encoded by intra prediction, PART_2N×2N or PART_N×N among the 8 partition modes of FIG. 3B may be applied to the coding block.

PART_N×N may be applied when the coding block has a minimum size. Here, the minimum size of the coding block may be pre-defined in the encoder and the decoder. Alternatively, information regarding the minimum size of the coding block may be signaled via the bitstream. For example, the minimum size of the coding block may be signaled through a slice header, so that the minimum size of the coding block may be defined for each slice.

In another example, partition candidates available to a coding block may be determined differently depending on at least one of a size or shape of the coding block. For example, the number or type of partition candidates available to the coding block may be determined differently according to at least one of the size or shape of the coding block.

Alternatively, the type or number of asymmetric partition candidates among the partition candidates available to the coding block may be limited depending on the size or shape of the coding block. For example, the number or type of asymmetric partition candidates available to the coding block may be differently determined according to at least one of the size or shape of the coding block.

In general, a prediction block may have a size from 64×64 to 4×4. However, when a coding block is encoded by inter prediction, it is possible to prevent the prediction block from having a 4×4 size in order to reduce a memory bandwidth when performing motion compensation.

It is also possible to recursively divide a coding block using the partition mode. That is, the coding block may be divided according to the partition mode indicated by a partition index, and each partition generated by partitioning the coding block may be defined as a coding block.

Hereinafter, a method of recursively partitioning a coding unit will be described in more detail. For convenience of explanation, it is assumed that a coding tree unit is also included in a category of a coding unit. That is, in a later-described embodiment, a coding unit may refer to a coding tree unit, or may refer to a coding unit that is generated resulting from partitioning the coding tree unit. Also, when a coding block is recursively divided, it can be understood that a 'partition' generated by partitioning the coding block means a 'coding block'.

A coding unit may be divided by at least one line. At this time, the line dividing the coding unit may have a predetermined angle. Here, the predetermined angle may be a value within a range of 0-degree to 360-degree. For example, a 0-degree line may mean a horizontal line, a 90-degree line may mean a vertical line, and a 45-degree or 135-degree line may mean a diagonal line.

When a coding unit is divided by a plurality of lines, all of the plurality of lines may have the same angle. Alternatively, at least one of the plurality of lines may have an angle different from the other lines. Alternatively, the plurality of lines dividing a coding tree unit or a coding unit may be set to have a predefined angle difference (e.g., 90-degree).

Information regarding the line dividing a coding tree unit or a coding unit may be defined as a partition mode and be encoded. Alternatively, information on the number of lines, directions, angles, positions of lines in a block, or the like may be encoded.

For convenience of explanation, it is assumed in the embodiment described below that a coding tree unit or a coding unit is divided into a plurality of coding units using at least one of a vertical line and a horizontal line.

When it is assumed that partitioning of a coding unit is performed based on at least one of a vertical line or a horizontal line, the number of vertical lines or horizontal lines partitioning the coding unit may be one or more. For example, the coding tree unit or the coding unit may be divided into two partitions using one vertical line or one horizontal line, or the coding unit may be divided into three partitions using two vertical lines or two horizontal lines. Alternatively, the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size. Alternatively, any one partition may have a different size from the remaining partitions or each partition may have a different size.

In the embodiments described below, it is assumed that dividing a coding unit into four partitions is a quad-tree based partitioning, and that dividing a coding unit into two partitions is a binary-tree based partitioning. In addition, it is assumed that dividing a coding unit into three partitions is a triple-tree based partitioning. In addition, it is assumed that a dividing scheme by applying at least two or more partitioning scheme is a multi-tree based partitioning.

In the following drawings, it will be illustrated that a predetermined number of vertical lines or a predetermined number of horizontal lines are used to divide a coding unit, but it will also be within a scope of the present invention to divide the coding unit into more partitions or fewer partitions than shown using a greater number of vertical lines or a greater number of horizontal lines than shown.

Figure 4A:
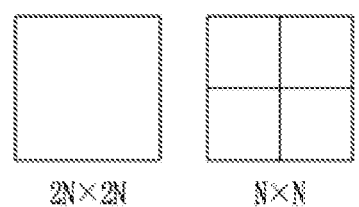
FIGS. 4A to 4C are diagrams illustrating a partition type in which a quad tree and a binary tree partitioning are allowed according to an embodiment of the present invention.
Figure 4B:
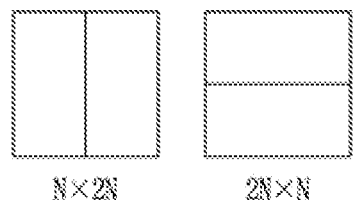
Figure 4C:
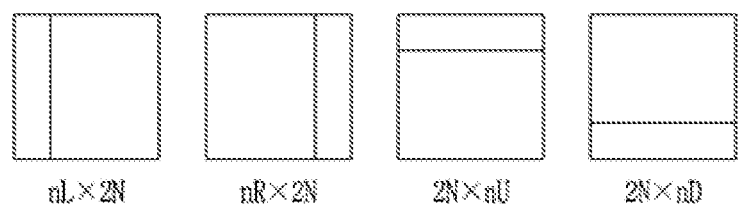

FIGS. 4A to 4C are diagrams illustrating a partition type in which a quad tree and a binary tree partitioning are allowed according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks (FIG. 4A), and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. In addition, the coding block partitioned based on the binary tree may be a square block or a non-square block, such as a rectangular shape. For example, as depicted in FIG. 4B, a partition type in which the binary tree-based partitioning is allowed may be a symmetric type of 2N×N (horizontal directional non-square coding unit) or N×2N (vertical direction non-square coding unit). In addition, as one example depicted in FIG. 4C, a partition type in which the binary tree-based partitioning is allowed may be an asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree CU partitioning. Constructing the coding tree unit with square blocks and symmetric non-square blocks may correspond to quad and binary tree CU partitioning.

Hereinafter, a partitioning scheme based on a quad-tree and a binary-tree is referred to as Quad-Tree & Binary-Tree (QTBT) partitioning.

As a result of partitioning based on quad-tree and binary-tree, a coding block that is no longer divided may be used as a prediction block or a transform block. That is, in a quad-tree & binary-tree (QTBT) partitioning method, a coding block may become a prediction block, and a prediction block may become a transform block. For example, when the QTBT partitioning method is used, a prediction image may be generated in a unit of a coding block, and a residual signal, which is a difference between an original image and the prediction image, is transformed in a unit of a coding block. Here, generating the prediction image in a unit of a coding block may mean that motion information is determined based on a coding block or an intra prediction mode is determined based on a coding block. Accordingly, a coding block may be encoded using at least one of a skip mode, intra prediction, or inter prediction.

As another example, it is also possible to divide a coding block so as to use a prediction block or a transform block having a size smaller than the coding block.

In a QTBT partitioning method, BT may be set to be allowed only for symmetric partitioning. However, if only the symmetric binary tree is allowed even though an object and a background are divided at a block boundary, an encoding efficiency may be decreased. In the present invention, a method of asymmetric partitioning a coding block in order to increase an encoding efficiency will be described below as another embodiment. Asymmetric binary tree partitioning represents a division of a coding block into two smaller coding blocks. As a result of the asymmetric binary tree partitioning, a coding block may be divided into two coding blocks of an asymmetric shape.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5:
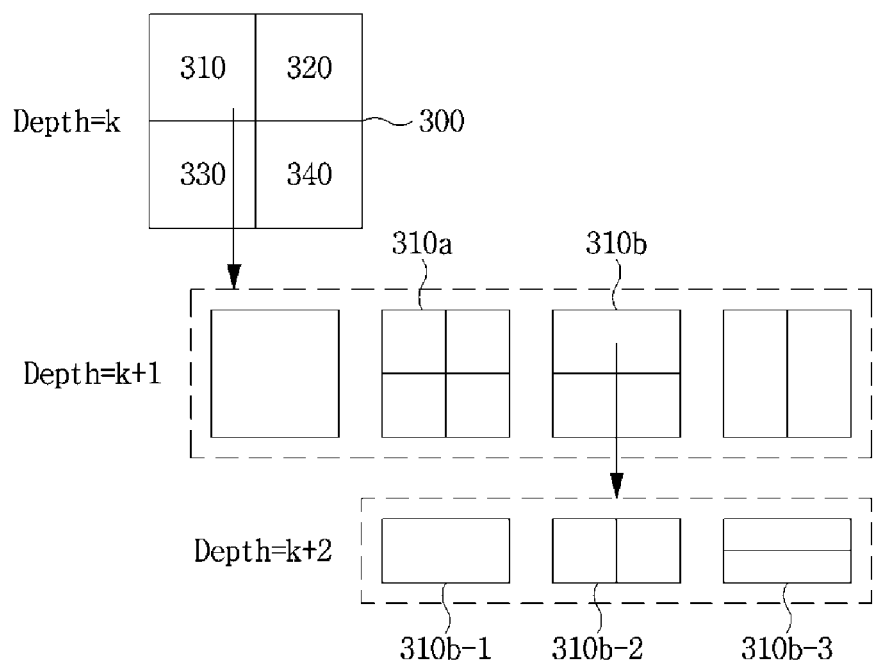
FIG. 5 illustrates an example in which a coding block is hierarchically divided based on quad tree partitioning and binary tree partitioning, according to an embodiment to which the present invention is applied.

FIG. 5 illustrates an example in which a coding block is hierarchically divided based on quad tree partitioning and binary tree partitioning, according to an embodiment to which the present invention is applied.

As shown in FIG. 5, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

Figure 6A:
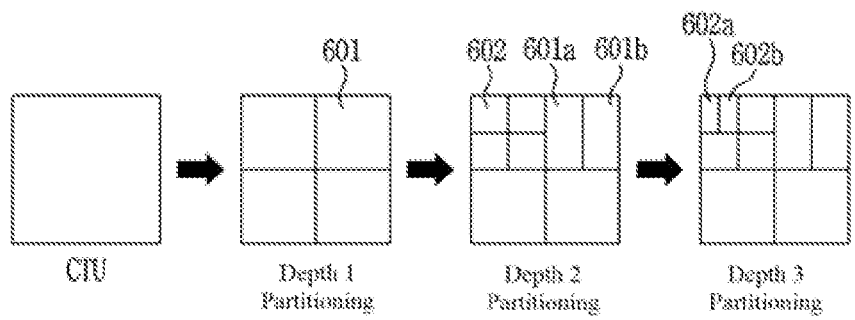
FIGS. 6A to 6C illustrates an example in which a coding block is hierarchically divided based on quad tree partitioning and symmetric binary tree partitioning, according to an embodiment to which the present invention is applied.
Figure 6B:
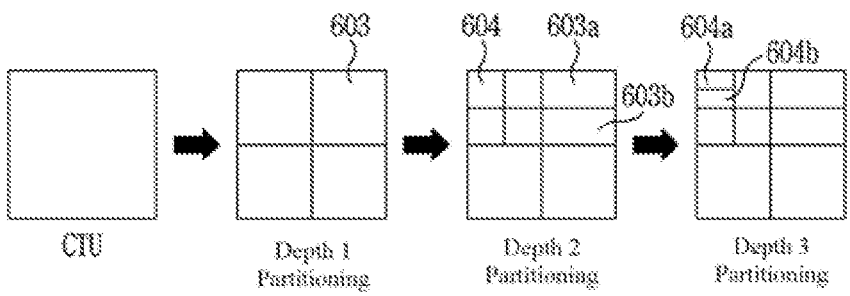
Figure 6C:
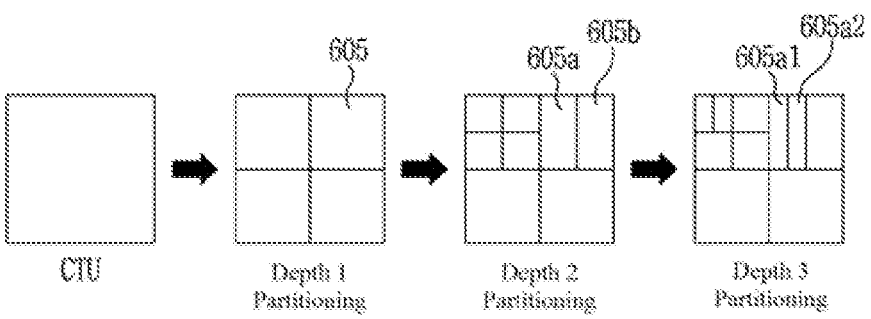

FIGS. 6A to 6C illustrates an example in which a coding block is hierarchically divided based on quad tree partitioning and symmetric binary tree partitioning, according to an embodiment to which the present invention is applied.

FIGS. 6A to 6C illustrates an example in which only a specific type, for example a symmetric binary tree based partitioning, is allowed. FIG. 6A shows an example in which only binary tree based partitioning in a type of N×2N is limitedly allowed. For example, a depth 1 coding block 601 is divided into two N×2N blocks 601a and 601b in depth 2, and a depth 2 coding block 602 is divisible into two N×2N blocks 602a and 602b in depth 3.

FIG. 6B shows an example in which only binary tree based partitioning of a 2N×N type is limitedly allowed. For example, a depth 1 coding block 603 is divided into two 2N×N blocks 603a and 603b in depth 2, and a depth 2 coding block 604 is divisible into two 2N×N blocks 604a and 604b in depth 3.

FIG. 6C shows an example of partitioning a block which is generated by a symmetric binary tree partitioning. For example, a depth 1 coding block 605 is divided into two N×2N blocks 605a and 605b in depth 2, and the depth 2 coding block 605a generated as a result of the division is divided into two N×2N blocks 605a1 and 605a2. The above described divisional manner is also applicable to a 2N×N coding block which is generated by symmetric binary tree partitioning.

In order to implement quad-tree or binary tree based adaptive partitioning, information indicating quad-tree based partitioning, information on a size/depth of a coding block to which quad-tree based partitioning is allowed, information indicating binary-tree based partitioning, information about a size/depth of a coding block to which binary-tree based partitioning is allowed, information on a size/depth of a coding block to which binary-tree based partitioning is disallowed, information whether binary-tree based partitioning is performed in a vertical direction or a horizontal direction, or the like may be used. For example, quad_split_flag may indicate whether a coding block is divided into four coding blocks, and binary_split_flag may indicate whether a coding block is divided into two coding blocks. When a coding block is divided into two coding blocks, is_hor_split_flag indicating whether a partitioning direction of the coding block is a vertical direction or a horizontal direction may be signaled.

Also, for a coding tree unit or a predetermined coding unit, the number of times for which binary tree partitioning is allowed, a depth at which binary tree partitioning is allowed, or the number of the depths to which the binary tree partitioning is allowed may be obtained. The information may be encoded in a unit of a coding tree unit or a coding unit, and may be transmitted to the decoder through a bitstream.

For example, a syntax 'max_binary_depth_idx_minus1' indicating a maximum depth at which binary tree partitioning is allowed may be encoded/decoded through the bitstream. In this case, max_binary_depth_idx_minus1+1 may indicate a maximum depth at which binary tree partitioning is allowed.

In addition, in the example of FIG. 6C described above, it is illustrated a result of binary tree partitioning relating to depth 2 coding units (e.g., 605a and 605b) and depth 3 coding units (e.g., 605a1 and 605a2). Thus, at least one of information indicating the number of times (e.g., twice) for which binary tree partitioning has been performed in the coding tree unit, information indicating a maximum depth (e.g., depth 3) at which binary tree partitioning is allowed in the coding tree unit, or information indicating the number of depths (e.g., 2, depth 2 and depth 3) to which binary tree partitioning is allowed may be encoded/decoded through the bitstream.

As another example, at least one of the number of times for which binary tree partitioning is allowed, a depth at which binary tree partitioning is allowed, or the number of depths to which binary tree partitioning is allowed may be obtained for each sequence or slice. For example, the information may be encoded in a unit of a sequence, a picture, or a slice and transmitted through the bitstream. Accordingly, a first slice and a second slice may differ in at least one of the number of times for which binary tree partitioning is performed, a maximum depth at which binary tree partitioning is allowed, or the number of depths to which binary tree partitioning is allowed. For example, in the first slice, binary tree partitioning is allowed at only one depth, while in the second slice, binary tree partitioning is allowed at two depths.

As another example, at least one of the number of times for which binary tree partitioning is allowed, a depth at which binary tree partitioning is allowed, or the number of depths to which binary tree partitioning is allowed may be set differently according to a time level identifier (Temporal_ID) of a slice or a picture. Here, the temporal level identifier (Temporal_ID) is used to identify each of a plurality of layers of a video having a scalability of at least one of view, spatial, temporal or image quality.

It is also possible to restrict use of a transform skip for a CU which is partitioned by binary partitioning. Alternatively, a transform skip may be applied only in at least one of a horizontal direction or a vertical direction for a CU which is partitioned by non-square partitioning. Applying a transform skip only in a horizontal direction may mean that only a scaling and a quantization are performed in a horizontal direction without performing a transform in the horizontal direction, and a transform is performed in a vertical direction by specifying at least one transform scheme such as DCT or DST.

Likewise, applying a transform skip only in a vertical direction may mean that a transform is performed in a horizontal direction by specifying at least one transform scheme such as DCT or DST, and only a scaling and a quantization are performed in a vertical direction without performing a transform in the vertical direction. It is also possible to signal a syntax hor_transform_skip_flag indicating whether to apply a transform skip in a horizontal direction and a syntax ver_transform_skip_flag indicating whether to apply a transform skip in a vertical direction.

When a transform skip is applied to at least one of a horizontal direction or a vertical direction, information indicating a direction to which the transform skip is applied may be signaled according to a shape of a CU. Specifically, for example, for a CU of 2N×N shape, a transform is performed in a horizontal direction and a transform skip can be applied on a vertical direction, and, for a CU of N×2N shape, a transform skip can be applied in a horizontal direction and a transform is performed on a vertical direction. Here, the transform may be at least one of DCT or DST.

As another example, for a CU of 2N×N shape, a transform is performed in a vertical direction and a transform skip can be applied in a horizontal direction, and, for a CU of N×2N shape, a transform skip can be applied in a vertical direction and a transform is performed in a horizontal direction. Here, the transform may be at least one of DCT or DST.

Figure 7:
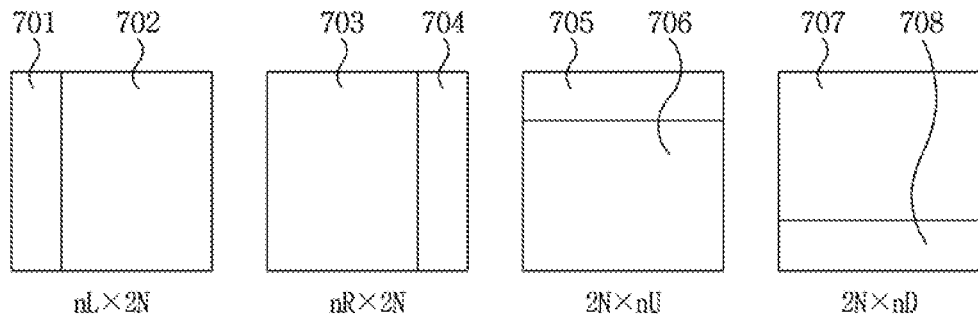
FIG. 7 is a diagram illustrating a partition type in which an asymmetric binary tree partitioning is allowed as an embodiment to which the present invention is applied.

FIG. 7 is a diagram illustrating a partition type in which an asymmetric binary tree partitioning is allowed as an embodiment to which the present invention is applied. A coding block of 2N×2N may be divided into two coding blocks whose width ratio is n:(1−n) or two coding blocks whose height ratio is n:(1−n). Where n may represent a real number greater than 0 and less than 1.

For example, it is illustrated in FIG. 7 that two coding blocks 701, 702 whose width ratio is 1:3 or two coding block 703, 704 whose width ratio is 3:1, two coding blocks 705, 706 whose height ratio is 1:3, two coding blocks whose height ratio is 3:1 are generated by applying the asymmetric binary tree partitioning to a coding block.

Specifically, as a coding block of W×H size is partitioned in a vertical direction, a left partition whose width is ¼W and a right partition whose width is ¾W may be generated. As described above, a partition type in which the width of the left partition is smaller than the width of the right partition can be referred to as nL×2N binary partition.

As a coding block of W×H size is partitioned in a vertical direction, a left partition whose width is ¾W and a right partition whose width is ¼W may be generated. As described above, a partition type in which the width of the right partition is smaller than the width of the left partition can be referred to as nR×2N binary partition.

As a coding block of W×H size is partitioned in a horizontal direction, a top partition whose width is ¼H and a bottom partition whose width is ¾H may be generated. As described above, a partition type in which the height of the top partition is smaller than the height of the bottom partition can be referred to as 2N×nU binary partition.

As a coding block of W×H size is partitioned in a horizontal direction, a top partition whose width is ¾H and a bottom partition whose width is ¼H may be generated. As described above, a partition type in which the height of the bottom partition is smaller than the height of the top partition can be referred to as 2N×nD binary partition.

In FIG. 7, it is illustrated that a width ratio or a height ratio between two coding blocks is 1:3 or 3:1. However, the width ratio or the height ratio between two coding blocks generated by asymmetric binary tree partitioning is not limited thereto. The coding block may be partitioned into two coding blocks having different width ratio or different height ratio from those shown in the FIG. 7.

When the asymmetric binary tree partitioning is used, an asymmetric binary partition type of a coding block may be determined based on information signaled via a bitstream. For example, a partition type of a coding block may be determined based on information indicating a partitioning direction of the coding block and information indicating whether a first partition, generated by dividing the coding block, has a smaller size than a second partition.

The information indicating the partitioning direction of the coding block may be a flag of 1 bit indicating whether the coding block is partitioned in a vertical direction or in a horizontal direction. For example, hor_binary_flag may indicate whether the coding block is partitioned in a horizontal direction. If a value of hor_binary_flag is 1, it may indicate that the coding block is partitioned in the horizontal direction and if the value of hor_binary_flag is 0, it may indicate that the coding block is partitioned in the vertical direction. Alternatively, ver_binary_flag indicating whether or not the coding block is partitioned in the vertical direction may be used.

The information indicating whether the first partition has a smaller size than the second partition may be a flag of 1 bit. For example, is_left_above_small_part_flag may indicate whether a size of a left or top partition generated by dividing the coding block is smaller than a right or bottom partition. If a value of is_left_above_small_part_flag is 1, it means that the size of the left or top partition is smaller than the right or bottom partition. If the value of is_left_above_small_part_flag is 0, it means that the size of the left or top partition is larger than the right or bottom partition. Alternatively, is_right_bottom_small_part_flag indicating whether the size of the right or bottom partition is smaller than the left or top partition may be used.

Alternatively, sizes of a first partition and a second partition may be determined by using information indicating a width ratio, a height ratio or an area ratio between the first partition and the second partition.

When a value of hor_binary_flag is 0 and a value of is_left_above_small_part_flag is 1, it may represent nL×2N binary partition, and when a value of hor_binary_flag is 0 and a value of is_left_above_small_part_flag is 0, it may represent nR×2N binary partition. In addition, whan a value of hor_binary_flag is 1 and a value of is_left_above_small_part_flag is 1, it may represent 2N×nU binary partition, and when a value of hor_binary_flag is 1 and a value of is_left_above_small_part_flag is 0, it may represent 2N×nD binary partition.

As another example, the asymmetric binary partition type of the coding block may be determined by index information indicating a partition type of the coding block. Here, the index information is information to be signaled through a bitstream, and may be encoded with a fixed length (i.e., a fixed number of bits) or may be encoded with a variable length. For example, Table 1 below shows the partition index for each asymmetric binary partition.

TABLE 1

| | Asymmetric partition index | Binarization |
|---|---|---|
| nLx2N | 0 | 0 |
| nRx2N | 1 | 10 |
| 2NxnU | 2 | 100 |
| 2NxnD | 3 | 111 |

Asymmetric binary tree partitioning may be used depending on the QTBT partitioning method. For example, if the quadtree partitioning or the binary tree partitioning is no longer applied to the coding block, it may be determined whether or not to apply asymmetric binary tree partitioning to the coding block. Here, whether or not to apply the asymmetric binary tree partitioning to the coding block may be determined by information signaled through the bitstream. For example, the information may be a 1 bit flag 'asymmetric_binary_tree_flag', and based on the flag, it may be determined whether the asymmetric binary tree partitioning is to be applied to the coding block. Alternatively, when it is determined that the coding block is partitioned into two blocks, it may be determined whether the partition type is binary tree partitioning or asymmetric binary tree partitioning. Here, whether the partition type of the coding block is the binary tree partitioning or the asymmetric binary tree partitioning may be determined by information signaled through the bitstream. For example, the information may be a 1 bit flag 'is_asymmetric_split_flag', and based on the flag, it may be determined whether the coding block is to be partitioned into a symmetric form or an asymmetric from. As another example, indexes assigned to symmetric type binary partitions and to asymmetric type binary partitions may be different, and it may be determined based on index information whether the coding block is to be partitioned in a symmetric type or an asymmetric type. For example, Table 2 shows an example in which different indexes are assigned to symmetric binary type partitions and asymmetric binary type partitions.

TABLE 2

| | Binary partition index | Binarization |
|---|---|---|
| 2NxN (Binary partition in horizontal direction) | 0 | 0 |
| Nx2N (Binary partition in vertical direction) | 1 | 10 |
| nLx2N | 2 | 110 |
| nRx2N | 3 | 1110 |
| 2NxnU | 4 | 11110 |
| 2NxnD | 5 | 11111 |

Figure 8A:
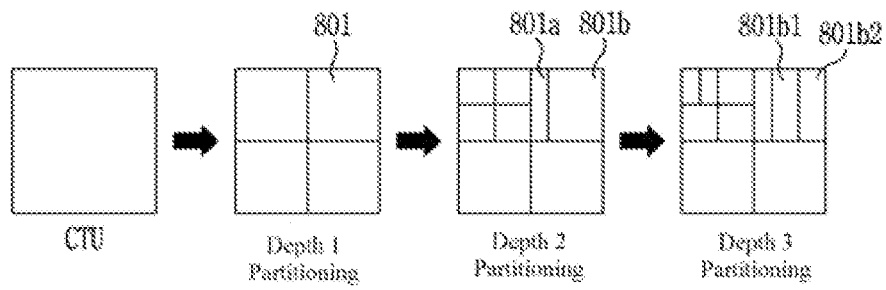
FIGS. 8A to 8C illustrates a partition type of a coding block based on quad tree and symmetric/asymmetric binary tree partitioning as an embodiment to which the present invention is applied.
Figure 8B:
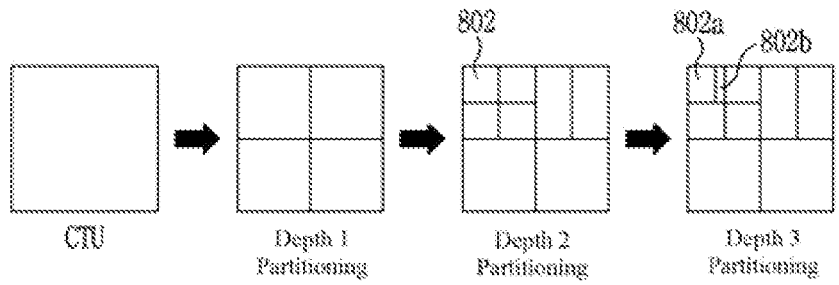
Figure 8C:
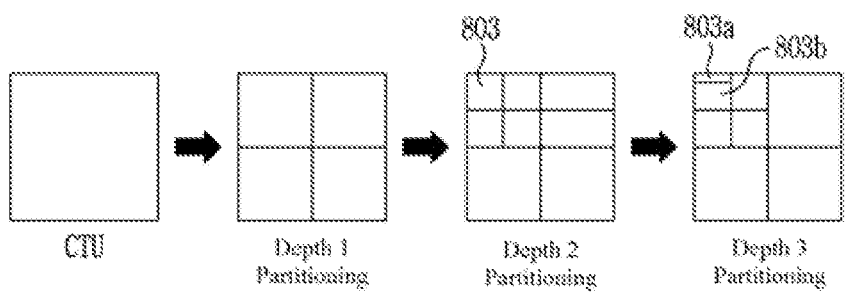
Figure 9:
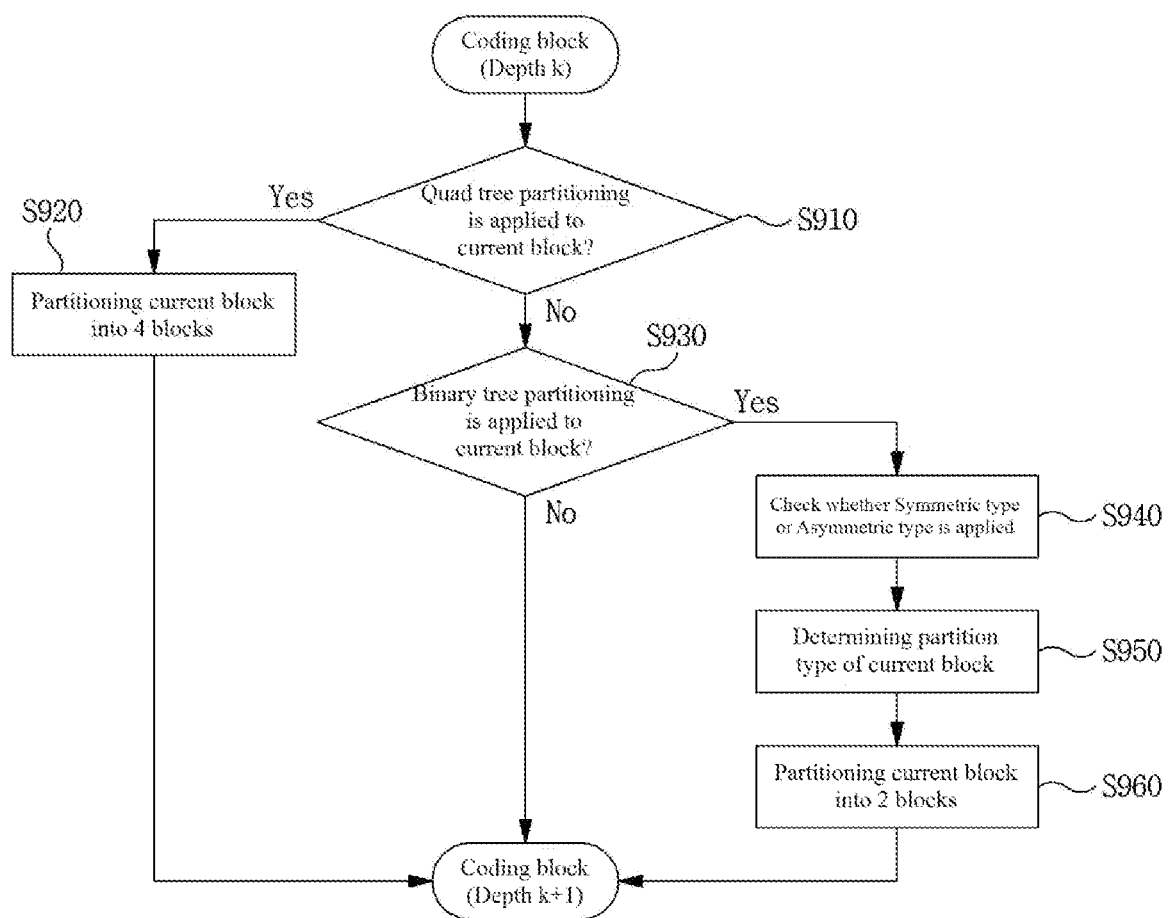
FIG. 9 is a flowchart illustrating a coding block partitioning method based on quad tree and binary tree partitioning according to an embodiment to which the present invention is applied.

A coding tree or a coding block may be divided into a plurality of coding blocks by quad tree partitioning, binary tree partitioning or asymmetric binary tree partitioning. For example, FIGS. 8A to 8C shows an example in which a coding block is divided into a plurality of coding blocks using QTBT and asymmetric binary tree partitioning. Referring to FIG. 9, it can be seen that the asymmetric binary tree partitioning is performed in depth 2 partitioning in the first drawing, depth 3 partitioning in the second drawing, and depth 3 partitioning in the third drawing, respectively. It may be restricted that a coding block divided by the asymmetric binary tree partitioning is no longer divided. For example, information related to a quadtree, binary tree, or asymmetric binary tree may not be encoded/decoded for a coding block which is generated by the asymmetric binary tree partitioning. That is, for a coding block generated through the asymmetric binary tree partitioning, a flag indicating whether quadtree partitioning is applied, a flag indicating whether binary tree partitioning is applied, a flag indicating whether asymmetric binary tree partitioning is applied, a flag indicating a direction of the binary tree partitioning or the asymmetric binary tree partitioning, or index information indicating an asymmetric binary partition, or the like may be omitted. As another example, whether or not to allow the binary tree partitioning may be determined depending on whether the QTBT is allowed or not. For example, in a picture or slice in which the QTBT-based partitioning method is not used, it may be restricted not to use the asymmetric binary tree partitioning.

Information indicating whether the asymmetric binary tree partitioning is allowed may be encoded and signaled in a unit of a block, a slice or a picture. Here, the information indicating whether the asymmetric binary tree partitioning is allowed may be a flag of 1 bit. For example, if a value of is used asymmetric QTBT enabled flag is 0, it may indicate that the asymmetric binary tree partitioning is not used. It is also possible that is_used_asymmetric_QTBT_enabled_ Flag is set to 0 without signaling thereof when the binary tree partitioning is not used in a picture or a slice.

FIGS. 8A to 8C illustrates a partition type of a coding block based on quad tree and symmetric/asymmetric binary tree partitioning as an embodiment to which the present invention is applied.

FIG. 8A shows an example in which nL×2N type asymmetric binary tree based partitioning is allowed. For example, depth 1 coding block 801 is divided into two asymmetric nL×2N blocks 801a and 801b at depth 2, and depth 2 coding block 801b is also divided into two symmetric N×2N blocks 801b1 and 801b2 at depth 3.

FIG. 8B shows an example in which nR×2N type asymmetric binary tree based partitioning is allowed. For example, depth 2 coding block 802 is divided into two asymmetric nR×2N blocks 802a and 802b at depth 3.

FIG. 8C shows an example in which 2N×nU type asymmetric binary tree based partitioning is allowed. For example, depth 2 coding block 803 is divided into two asymmetric 2N×nU blocks 803a and 803b at depth 3.

It is also possible to determine a partition type allowed in a coding block based on a size, a shape, a partition depth, or a partition type of the coding block. For example, at least one of partition types, partition shapes or a number of partitions allowed in a coding block generated by the quad tree partitioning and in a coding block generated by the binary tree partitioning may be different from each other.

For example, if a coding block is generated by the quadtree partitioning, all of the quadtree partitioning, the binary tree partitioning, and the asymmetric binary tree partitioning may be allowed for the coding block. That is, if a coding block is generated based on quad tree partitioning, all partition types shown in FIG. 10 can be applied to the coding block. For example, a 2N×2N partition may represent a case where a coding block is not further divided, N×N may represent a case where a coding block is partitioned in a quad-tree, and N×2N and 2N×N may represent a case where a coding block is partitioned in a binary tree. In addition, nL×2N, nR×2N, 2N×nU, and 2N×nD may represent cases where a coding block is partitioned in an asymmetric binary tree.

On the other hand, when a coding block is generated by the binary tree partitioning, it may not be allowed to use the asymmetric binary tree partitioning for the coding block. That is, when the coding block is generated based on the binary tree partitioning, it may be restricted not to apply the asymmetric partition type (nL×2N, nR×2N, 2N×nU, 2N×nD) among the partition types shown in FIG. 7 to the coding block.

FIG. 9 is a flowchart illustrating a coding block partitioning method based on quad tree and binary tree partitioning as an embodiment to which the present invention is applied.

Assume that a depth k coding block is divided into a depth k+1 coding block. First, it is determined whether quad tree partitioning is applied to a current block at depth k S910. If quad tree partitioning is applied, the current block is split into four blocks of a square shape S920. On the other hand, if quad tree partitioning is not applied, it is determined whether binary tree partitioning is applied to the current block S930. If binary tree splitting is not applied, then the current block becomes a depth k+1 coding block without splitting. As a result of the determination of S930, if binary tree partitioning is applied to the current block, it is checked whether either symmetric binary partitioning or asymmetric binary partitioning is applied S940. According to the determination result of S940, a partition type applied to the current block is determined S950. For example, the partition type applied to the step S950 may be any one of symmetric types in FIG. 4B, or one of the asymmetric types in FIG. 4C. The current block is divided into two depth k+1 coding blocks according to the partition type determined at S950 S960.

Figure 10:
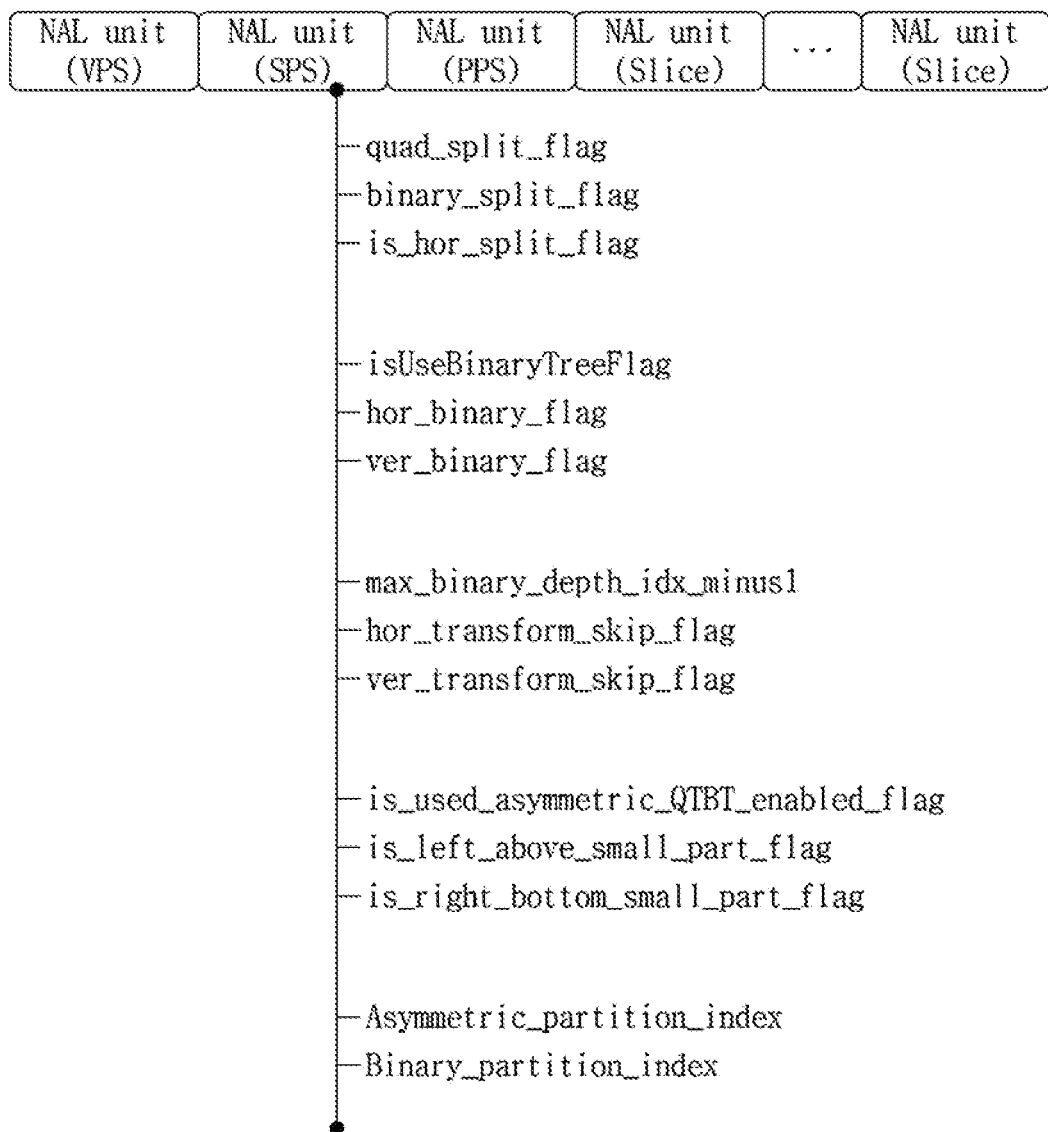
FIG. 10 illustrates, as an embodiment to which the present invention is applied, a syntax element included in a network abstract layer (NAL) to which quadtree and binary tree partitioning are applied.

FIG. 10 illustrates, as an embodiment to which the present invention is applied, a syntax element included in a network abstract layer (NAL) to which quadtree and binary tree partitioning are applied.

A compressed image to which the present invention is applied may be packetized in a unit of a network abstract layer (hereinafter, referred to as 'NAL') and transmitted through a transmission medium. However, the present invention is not limited to NAL, but may be applied to various data transmission schemes to be developed in the future. NAL unit to which the present invention is applied, for example, may include a video parameter set (VPS), a sequence parameter set (SPS), a picture parameter set (PPS) and at least one slice set (Slice) as shown in FIG. 10.

For example, it is illustrated in FIG. 10 that a syntax element included in a sequence parameter set (SPS), but it is also possible to a picture parameter set (PPS) or a slice set (Slice) to include the syntax element. In addition, a syntax element to be commonly applied to sequence units or a picture unit may be included in a sequence parameter set (SPS) or a picture parameter set (PPS). On the other hand, a syntax element that is applied only to the slice is preferably included in a slice set (Slice). Therefore, this can be selected in consideration of encoding performance and efficiency.

In this regard, syntax elements to which quad tree and binary tree partitioning are applied are as follows. It is possible to set all syntax elements shown in FIG. 10 as essential elements, but it is also possible to selectively set some syntax elements among them as essential elements in consideration of encoding efficiency and performance.

For example, 'quad_split_flag' indicates whether a coding block is divided into four coding blocks. 'binary_split_flag' may indicate whether a coding block is split into two coding blocks. When the coding block is divided into two coding blocks, 'is_hor_split_flag' indicating whether a partitioning direction of the coding block is vertical or horizontal may be signaled. It can be defined that it represents a horizontal direction when "is_hor_split_flag=1", and it represents a vertical direction when "is_hor_split_flag=0".

In another alternative, it can be represented by 'isUseBinaryTreeFlag' whether binary tree partitioning is applied to a current block, and "hor_binary_flag" which is a syntax element representing a partitioning direction of a coding block may represents whether the current block is partitioned in a horizontal direction. For example, when "hor_binary_flag=1", this may indicate that a coding block is split in a horizontal direction, and when "hor_binary_flag=0", it may indicate that a coding block is split in a vertical direction. Or, instead of 'hor_binary_flag', ver_binary_flag indicating whether a coding block is partitioned in a vertical direction may be used in the same manner.

In addition, 'max_binary_depth_idx_minus1' may be defined as a syntax element to indicate a maximum depth in which binary tree partitioning is allowed. For example, "max_binary_depth_idx_minus1+1" may indicate a maximum depth at which binary tree partitioning is allowed.

In addition, 'ver_transform_skip_flag' may be set as a syntax element to indicate whether to apply a transform skip in a horizontal direction, and 'hor_transform_skip_flag' may be set as a syntax element to indicate whether to apply a transform skip in a vertical direction.

In addition, 'is_used_asymmetric_QTBT_enabled_flag' may be defined as a syntax element to indicate whether asymmetric binary tree partitioning is allowed. For example, when "is_used_asymmetric_QTBT_enabled_flag=1", it may indicate that asymmetric binary tree partitioning is used, and when "is_used_asymmetric_QTBT_enabled_flag=0" it may indicate that asymmetric binary tree partitioning is not used. On the other hand, when binary tree partitioning is not used in a picture unit or slice unit, a value of is_used_asymmetric_QTBT_enabled_flag may be set to 0 without signaling it. Alternatively, whether asymmetric binary tree partitioning is applied to the current block may be indicated through 'asymmetric_binary_tree_flag'.

In addition, as a syntax element indicating asymmetric binary tree partitioning, 'is_left_above_small_part_flag' may indicate whether a size of a left or top partition generated by partitioning a coding block is smaller than a right or bottom partition. For example, if "is_left_above_small_part_flag=1", it may mean a size of a left or top partition is smaller than a right or bottom partition, and if "is_left_above_small_part_flag=0", it may mean a size of a left or top partition is larger than a right or bottom partition. Alternatively, instead of 'is_left_above_small_part_flag', 'is_right_bottom_small_part_flag' indicating whether a size of a right or bottom partition is smaller than a left or top partition may be used.

In this regard, it is possible to combine the syntax elements to define an asymmetric binary partition type of a coding block. For example, when "hor_binary_flag=0" and "is_left_above_small_part_flag=1", it may represent nL×2N binary partition, and when "hor_binary_flag=0" and "is_left_above_small_part_flag=0", it may represent nR×2N binary partition. In addition, when "hor_binary_flag=1" and "is_left_above_small_part_flag=1", it may represent 2N×nU binary partition, and when "hor_binary_flag=1" and "is_left_above_small_part_flag=0", it may represent 2N×nD binary partition. Similarly, an asymmetric binary partition type may be represented by a combination of 'ver_binary_flag' and 'is_right_bottom_small_part_flag'.

In another alternative, an asymmetric binary partition type of a coding block may be defined by indicating an index in above described Table 1 by 'Asymmetric_partition_index' or may be defined by indicating an index in above described Table 2 by 'Binary_partition_index'.

As described in the above example, a coding unit (or a coding tree unit) can be recursively divided by at least one vertical or horizontal line. For example, it can be summarized that quad tree partitioning is a method of dividing a coding block using a horizontal line and a vertical line, and a binary tree partitioning is a method of dividing a coding block using a horizontal line or a vertical line. A partition type of a coding block based on the quad tree partitioning and the binary tree partitioning is not limited to the example shown in FIG. 4A to FIG. 8C, and an extended partition type other than the illustrated types can be used. That is, a coding block may be recursively divided in a type different from that shown in FIGS. 4A to 8C.

FIGS. 11A to 11K are diagrams illustrating a partition type in which an asymmetric quad tree partitioning is allowed as another embodiment to which the present invention is applied.

When a current block is quad tree partitioned, at least one of a horizontal line or a vertical line may divide the coding block asymmetrically. Here, asymmetry may mean that heights of blocks divided by a horizontal line are not the same or widths of blocks divided by a vertical line are not the same. For example, a horizontal line may divide a coding block into asymmetrical shapes while a vertical line divides the coding block into symmetric shapes, or a horizontal line may divide a coding block into symmetrical shapes while a vertical line divides the coding block into asymmetric shapes. Alternatively, both the horizontal line and the vertical line may divide a coding block asymmetrically.

Figure 11A:
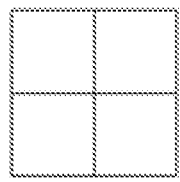
FIGS. 11A to 11K are diagrams illustrating a partition type in which an asymmetric quad tree partitioning is allowed as another embodiment to which the present invention is applied.
Figure 11B:
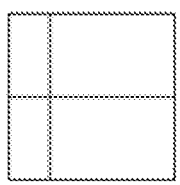
Figure 11C:
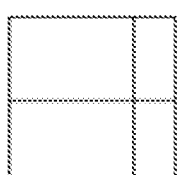
Figure 11D:
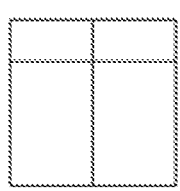
Figure 11E:
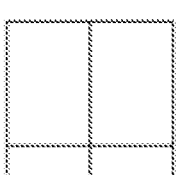

FIG. 11A shows a symmetric partitioning type of a coding block, and FIGS. 11B to 11K show asymmetric quad tree partitioning types of a coding block. FIG. 11A shows an example in which both a horizontal line and a vertical line are used for symmetric partitioning. FIGS. 11B and 11C show examples in which a horizontal line is used for symmetric partitioning whereas a vertical line is used for asymmetric partitioning. FIGS. 11D and 11E show examples in which a vertical line is used for symmetric partitioning while a horizontal line is used for asymmetric partitioning.

In order to specify a partition type of a coding block, information related to the partition type of the coding block may be encoded. Here, the information may include a first indicator indicating whether a partition type of a coding block is symmetric or asymmetric. The first indicator may be encoded in a unit of a block, or may be encoded for each vertical line or each horizontal line. For example, the first indicator may include information indicating whether a vertical line is to be used for symmetric partitioning and information indicating whether a horizontal line is to be used for symmetric partitioning.

Alternatively, the first indicator may be encoded only for a vertical line or a horizontal line, and a partition type of another line for which the first indicator is not encoded may be derived dependently by the first indicator. For example, the partition type of another line for which the first indicator is not encoded may have a value opposite to that of the first indicator. That is, if the first indicator indicates that a vertical line is used for asymmetric partitioning, it may be set to use a horizontal line for symmetric partitioning opposite to the first indicator.

It is also possible to further encode a second indicator for a vertical line or a horizontal line when the first indicator indicates asymmetric partitioning. Here, the second indicator may indicate at least one of a position of a vertical line or a horizontal line used for asymmetric partitioning or a ratio between blocks divided by the vertical line or the horizontal line.

Quad tree partitioning may be performed using a plurality of vertical lines or a plurality of horizontal lines. For example, it is also possible to divide a coding block into four blocks by combining at least one of one or more vertical lines or one or more horizontal lines.

FIGS. 11F to 11K are diagrams showing an example of partitioning a coding block asymmetrically by combining a plurality of vertical lines/horizontal lines and one horizontal line/vertical line.

Referring to FIGS. 11F to 11K, quad tree partitioning is performed by dividing a coding block into three blocks by two vertical lines or two horizontal lines, and then dividing one of the three divided blocks into two blocks. At this time, as in the example shown in FIGS. 11F to 11K, a block located in a center among the blocks divided by two vertical lines or two horizontal lines can be divided by a horizontal line or a vertical line. It is also possible to divide a block located at one side of the coding block by using a horizontal or a vertical line. Alternatively, information (e.g., a partition index) for specifying a partition to be divided among the three partitions may be signaled through a bitstream.

At least one of a horizontal line or a vertical line may be used to divide a coding block asymmetrically, and the other may be used to divide the coding block symmetrically. For example, a plurality of vertical lines or a plurality of horizontal lines may be used to divide a coding block into symmetric shapes, or one horizontal line or one vertical line may be used to divide the coding block into symmetric shapes. Alternatively, both horizontal line and vertical line may be used to divide the coding block into symmetric shapes, or may be used to divide the coding block into asymmetric shapes.

Figure 11F:
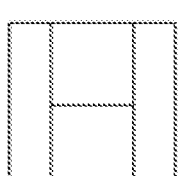
Figure 11G:
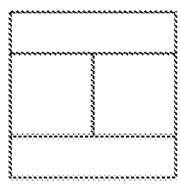

For example, FIG. 11F illustrates a partition type in which a coding block at a middle which is generated by asymmetric partitioning using two vertical lines is divided into two symmetric type coding blocks by a horizontal line. In addition, FIG. 11G illustrates a partition type in which a coding block at a middle which is generated by asymmetric partitioning using two horizontal lines is divided into two symmetric type coding blocks by a vertical line.

Figure 11H:
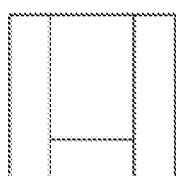
Figure 11I:
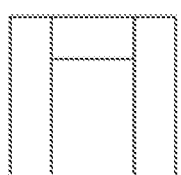
Figure 11J:
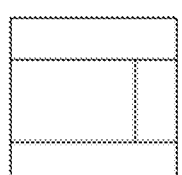
Figure 11K:
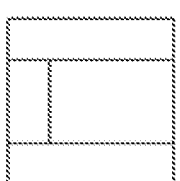

On the other hand, FIGS. 11H and 11I show partition types in which a coding block at a middle which is generated by asymmetric partitioning using two vertical lines is divided again into two asymmetric coding blocks by a horizontal line. In addition, FIGS. 11J and 11K show partition types in which a coding block at a middle which is generated by asymmetric partitioning using two horizontal lines is divided again into two asymmetric coding blocks by a vertical line.

When combining a plurality of vertical lines/horizontal lines and one horizontal line/one vertical line, the coding block can be divided into four partitions (i.e., four coding blocks) composed of at least two different sizes. A method of dividing a coding block into four partitions having at least two different sizes can be referred to as asymmetric quad tree partitioning of three types (Triple Type Asymmetric Quad-tree CU partitioning).

Information on the triple asymmetric quad tree partitioning may be encoded based on at least one of the first indicator or the second indicator described above. For example, the first indicator may indicate whether a partition type of a coding block is symmetric or asymmetric. The first indicator may be encoded in a unit of a block, or may be encoded each for a vertical line or a horizontal line. For example, the first indicator may include information indicating whether one or more vertical lines are to be used for symmetric partitioning and information indicating whether one or more horizontal lines are to be used for symmetric partitioning.

Alternatively, the first indicator may be encoded only for a vertical line or a horizontal line, and a partition type of another line for which the first indicator is not encoded may be derived by the first indicator.

It is also possible to further encode the second indicator for a vertical line or a horizontal line when the first indicator indicates asymmetric partitioning. Here, the second indicator may indicate at least one of a position of a vertical line or a horizontal line used for asymmetric partitioning or a ratio between blocks divided by a vertical line or a horizontal line.

Figure 12:
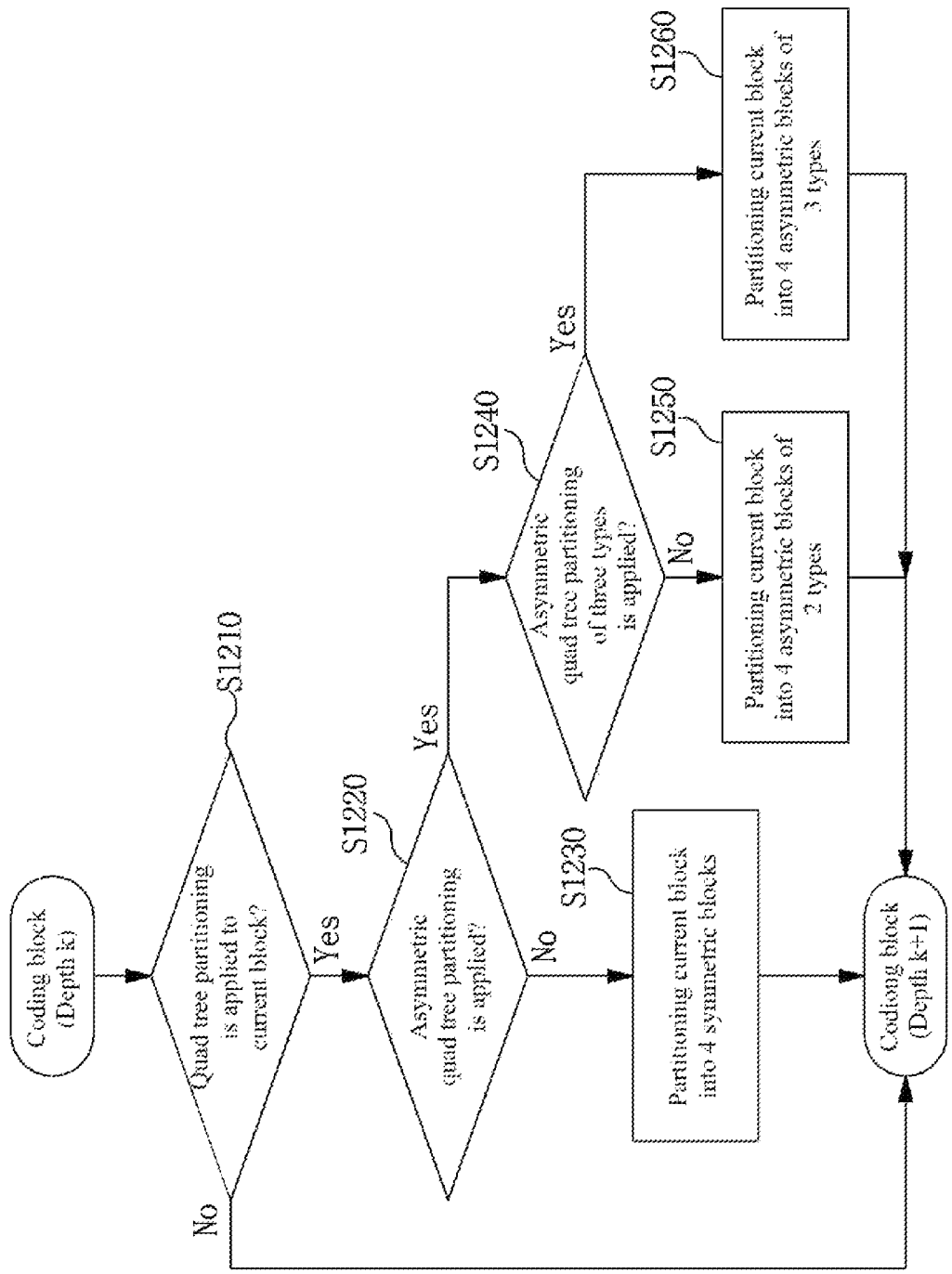
FIG. 12 is a flowchart illustrating a coding block partitioning method based on asymmetric quad tree partitioning as another embodiment to which the present invention is applied.

FIG. 12 is a flowchart illustrating a coding block partitioning method based on asymmetric quad tree partitioning as another embodiment to which the present invention is applied.

Assume that a depth k coding block is divided into a depth k+1 coding block. First, it is determined whether quad tree partitioning is applied to a current block at depth k S1210. As a result of the determination of step S1210, if it is determined that quad tree partitioning is not applied, the current block becomes a depth k+1 coding block without splitting. If it is determined in step S1210 that quad tree partitioning is applied, it is determined whether asymmetric quad tree partitioning is applied to the current block 51220. If asymmetric quad tree partitioning is not applied and symmetric quad tree partitioning is applied, the current block is split into four blocks of a square shape 51230.

On the other hand, if asymmetric quad tree partitioning is applied, it is determined whether asymmetric quad tree partitioning of three types is applied to the current block 51240. If asymmetric quad tree partitioning of three types is not applied, the current block is divided into four asymmetric blocks in two types S1250. In this case, the current block may be partitioned by any one partition types of FIGS. 11B to 11E according to partition information.

On the other hand, if asymmetric quad tree partitioning of three types is applied, the current block is divided into four asymmetric blocks in three types S1260. In this case, the current block may be partitioned by any one of partition types of FIGS. 11F to 11K according to partition information.

Figure 13:
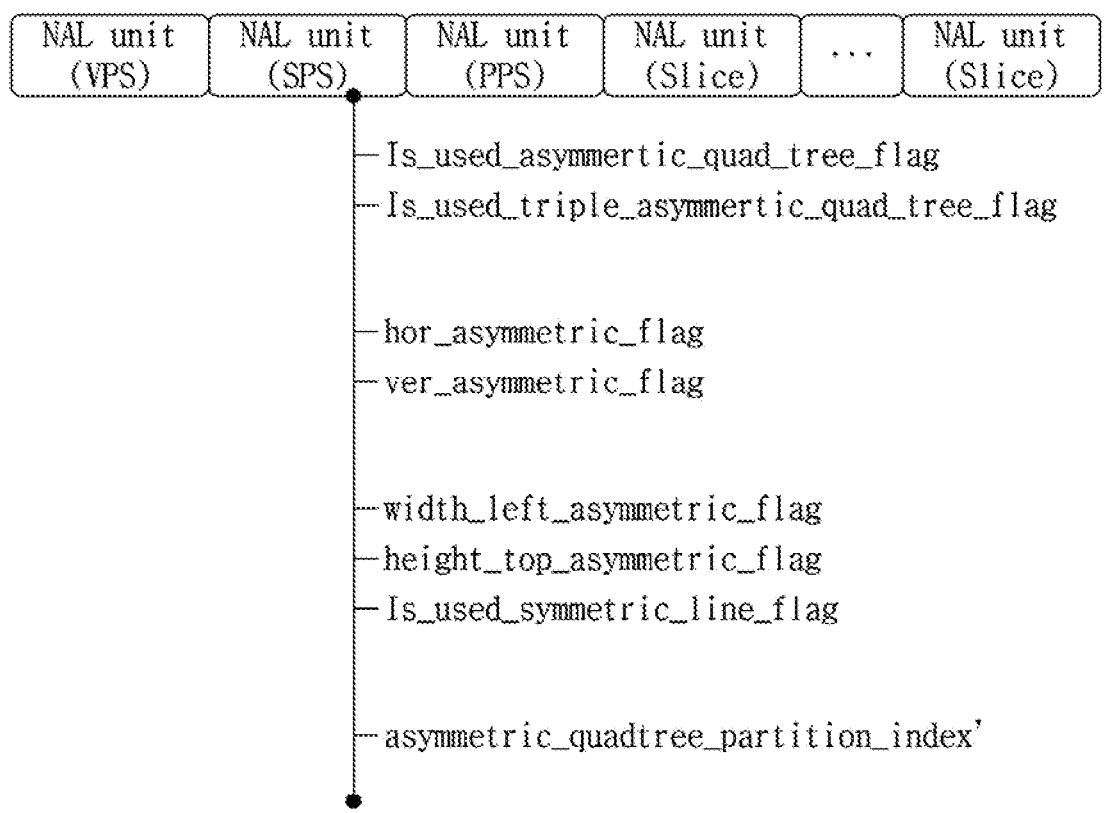
FIG. 13 illustrates a syntax element included in a network abstract layer (NAL) to which asymmetric quadtree partitioning is applied, as another embodiment to which the present invention is applied.

FIG. 13 illustrates a syntax element included in a network abstract layer (NAL) to which asymmetric quadtree partitioning is applied, as another embodiment to which the present invention is applied. The NAL unit to which the present invention is applied may include, for example, a video parameter set (VPS), a sequence parameter set (SPS), a picture parameter set (PPS), and at least one slice set (Slice).

For example, it is illustrated in FIG. 13 that a syntax element included in a sequence parameter set (SPS), but it is also possible to a picture parameter set (PPS) or a slice set (Slice) to include the syntax element. In addition, a syntax element to be commonly applied to sequence units or a picture unit may be included in a sequence parameter set (SPS) or a picture parameter set (PPS). On the other hand, a syntax element that is applied only to the slice is preferably included in a slice set (Slice). Therefore, this can be selected in consideration of encoding performance and efficiency.

A syntax element 'Is_used_asymmertic_quad_tree_flag' indicates whether quad tree partitioning is performed asymmetrically. In addition, 'Is_used_triple_asymmertic_ quad_tree_flag' indicates whether quad tree partitioning is performed asymmetrically with three types. Therefore, when "Is_used_asymmertic_quad_tree_flag=0", it means that quad tree partitioning is performed symmetrically, thus, 'Is_used_triple_asymmertic_quad_tree_flag' is not signaled. On the other hand, when "Is_used_asymmertic_quad_tree_flag=1" and "Is_used_triple_asymmertic_quad_tree_flag=1", it means asymmetric quad tree partitioning of three types is performed. In addition, when "Is_used_asymmertic_quad_tree_flag=1" and "Is_used_triple_asymmertic_quad_tree_flag=0", it means asymmetric quad tree partitioning of two types is performed.

A syntax element 'hor_asymmetric_flag' indicates a direction of asymmetric quad tree partitioning. That is, when "Is_used_asymmertic_quad_tree_flag=1", it may indicate whether the asymmetric partitioning is performed in a horizontal direction or a vertical direction. For example, when "hor_asymmetric_flag=1", it may indicate asymmetric partitioning in a horizontal direction, and when "hor_asymmetric_flag=0", it may indicate asymmetric partitioning in a vertical direction. Alternatively, it is also possible to utilize 'ver_asymmetric_flag'.

A syntax element 'width_left_asymmetric_flag' indicates another direction of asymmetric quad tree partitioning. That is, when "Is_used_asymmertic_quad_tree_flag=1", it may indicate whether asymmetric partitioning is performed in a left direction or a right direction based on a width. For example, when "width_left_asymmetric_flag '=1", it may indicate that asymmetric partitioning is performed for a left direction based on a width, and when "width left_asymmetric_flag=0", it may indicate that asymmetric partitioning is performed for a right direction based on a width.

In addition, a syntax element 'height_top_asymmetric_flag' indicates another direction of asymmetric quad tree partitioning. That is, when "Is_used_asymmertic_quad_tree_flag=1", it may indicate whether the asymmetric partitioning is performed in an upper direction or a lower direction based on a height. For example, when "height_top_asymmetric_flag=1", it may indicate that asymmetric partitioning is performed for an upper direction based on a height, and when "height_top_asymmetric_flag=0", it may indicate that asymmetric partitioning is performed for a lower direction based on a height.

In addition, a syntax element 'is_used_symmetric_line_flag' indicates whether blocks at a middle are symmetric or not when quad tree partitioning of three types is applied. That is, when "Is_used_asymmertic_quad_tree_flag=1" and "Is_used_triple_asymmertic_quad_tree_flag=1", it indicates that blocks at the middle are divided symmetrically.

Thus, through a combination of the syntax elements, it is possible to represent a partition type shown in FIGS. 11A to 11K. For example, when "Is_used_asymmertic_quad_tree_flag=0", it means that a block is partitioned into 4 symmetric blocks as shown in a partition type of FIG. 11 (a).

In addition, when "Is_used_asymmertic_quad_tree_flag=1" and "Is_used_triple_asymmertic_quad_tree_flag=0", it may mean any one of partition types of FIGS. 11B to 11E. In this case, when "hor_asymmetric_flag=1" and "width_left_asymmetric_flag '=1", this means a partition type of FIG. 11B. In addition, when "hor_asymmetric_flag=1" and "width left asymmetric flag '=0", it means a partition type of FIG. 11C. In addition, when "hor_asymmetric_flag=0" and "height_top_asymmetric_flag '=1", it means a partition type of FIG. 11D. In addition, when "hor_asymmetric_flag=0" and "height_top_asymmetric_flag'=0", it means a partition type of FIG. 11E.

In addition, when "Is_used_asymmertic_quad_tree_flag=1" and "Is_used_triple_asymmertic_quad_tree_flag=1", it means any one of partition types of FIGS. 11F to 11K. In this case, when "is_used_symmetric_line_flag=1", it means any one of partition types of FIGS. 11F and 11G, and when "is_used_symmetric_line_flag=0", it means any one of partition types of FIGS. 11H to 11K. In addition, when "is_used_symmetric_line_flag=1" and "hor_asymmetric_flag=1", it may be defined as a partition type of FIG. 11F, and when "hor_asymmetric_flag=0", it may be defined as a partition type of FIG. 11G.

In addition, when "Is_used_asymmertic_quad_tree_flag=1", "Is_used_triple_asymmertic_quad_tree_flag=1" and "is_used_symmetric_line_flag=0", a partition type may be defined by "hor_asymmetric_flag", "width_left_asymmetric_flag", and "height_top_asymmetric_flag". For example, when "hor_asymmetric_flag=1" and "height_top_asymmetric_flag=0", it means a partition type of FIG. 11H. In addition, when "hor_asymmetric_flag=1" and "height_top_asymmetric_flag=1", it means a partition type of FIG. 11I. In addition, when "hor_asymmetric_flag=0" and "width_left_asymmetric_flag=0", it means a partition type of FIG. 11J. In addition, when "hor_asymmetric_flag=0" and "width_left_asymmetric_flag=1", it means a partition type of FIG. 11K.

In addition, as another alternative, each partition types of FIGS. 11A to 11K may be represented as index by 'asymmetric quadtree partition index'.

Figure 14A:
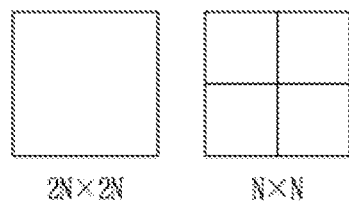
FIGS. 14A to 14C are diagrams illustrating a partition type allowing quad tree and triple tree partitioning are allowed as another embodiment to which the present invention is applied.
Figure 14B:
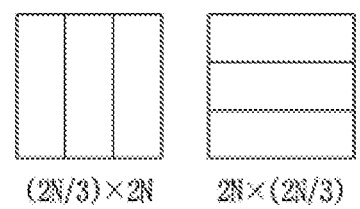
Figure 14C:
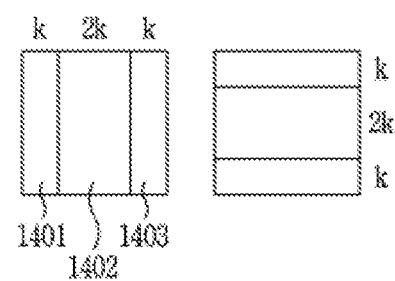

FIGS. 14A to 14C are diagrams illustrating a partition type allowing quad tree and triple tree partitioning are allowed as another embodiment to which the present invention is applied.

A coding block may be hierarchically divided based on at least one of a quad tree and a triple tree. Here, quad tree based partitioning means a manner of dividing a 2N×2N coding block into four N×N coding blocks (FIG. 14A), and triple tree based partitioning means a manner of dividing a coding block into three coding blocks. Even if triple tree based partitioning is performed, there may be a square coding block at a lower depth.

Triple tree based splitting may be performed symmetrically (FIG. 14B) or may be performed asymmetrically (FIG. 14C). In addition, a coding block divided based on triple tree may be a square block or a non-square block such as a rectangle. For example, a partition type that allows triple tree based partitioning is 2N×(2N/3) (horizontal non-square coding unit) or (2N/3)×2N (vertical non-square coding unit) that is symmetric with the same width or the same height as in the example shown in FIG. 14B. In addition, as an example, a partition type that allows triple tree based partitioning may be an asymmetric partition type including coding blocks having different widths or heights, as shown in the example illustrated in FIG. 14C. For example, in an asymmetric triple tree partition type according to FIG. 14C, at least two coding blocks 1401, 1403 may be located at both sides and have the same width (or height) of k, and the rest of a block 1402 may be located between the blocks 1401, 1404 having the same size and may have a width of 2k.

In this regard, a method of dividing a CTU or a CU into three sub-partitions having a non-square shape as shown in FIGS. 14A to 14C are referred to as triple tree partitioning method (triple tree CU partitioning). A CU divided by triple tree partitioning may be restricted from being partitioned additionally.

Figure 15:
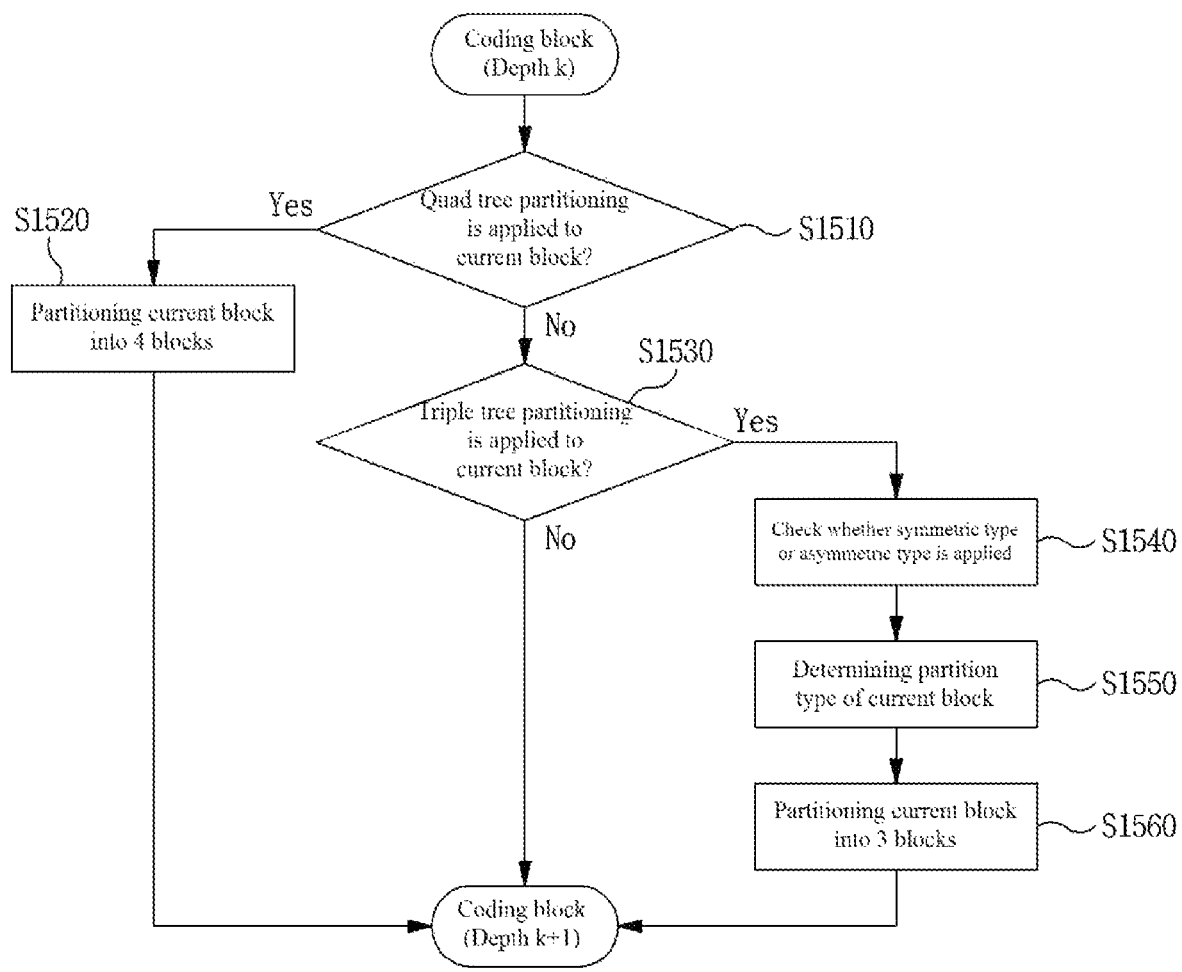
FIG. 15 is a flowchart illustrating a coding block partitioning method based on quad tree and triple tree partitioning as another embodiment to which the present invention is applied.

FIG. 15 is a flowchart illustrating a coding block partitioning method based on quad tree and triple tree partitioning as another embodiment to which the present invention is applied.

Assume that a depth k coding block is divided into a depth k+1 coding block. First, it is determined whether quad tree partitioning is applied to a current block at depth k S1510. If quad tree partitioning is applied, the current block is split into four square blocks S1520. On the other hand, if the quad tree partitioning is not been applied, it is determined whether triple tree partitioning is applied to the current block S1530. If triple tree partitioning is not applied, the current block becomes a depth k+1 coding block without partitioning.

As a result of the determination of S1530, if triple tree partitioning is applied to the current block, it is checked whether either of symmetric triple partitioning or asymmetric triple partitioning is applied S1540. A partition type applied to the current block is determined according to the determination result of S1540 S1550. For example, a partition type applied at step S1550 may be any one of types of FIG. 14B in the case of symmetry, or may be any one of the types of FIG. 14C in the case of asymmetry. According to a partition type determined at step S1550, the current block is divided into three coding blocks at depth k+1 S1560.

Figure 16:
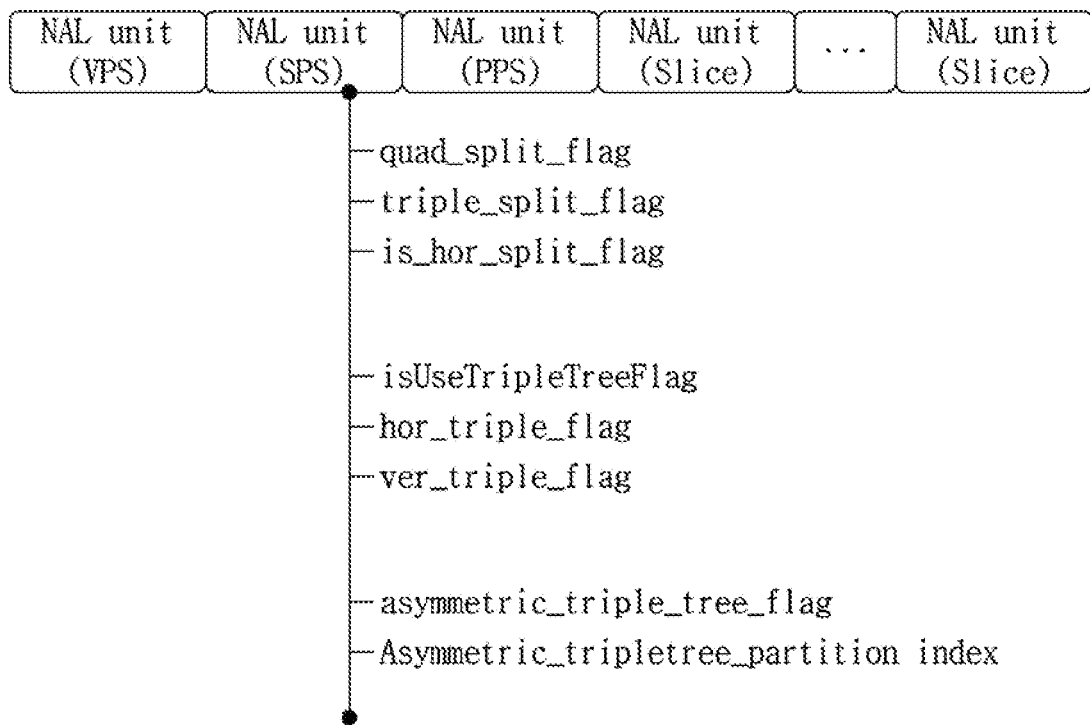
FIG. 16 illustrates, as another embodiment to which the present invention is applied, a syntax element included in a network abstract layer (NAL) to which quad tree and triple tree partitioning are applied.

FIG. 16 illustrates, as another embodiment to which the present invention is applied, a syntax element included in a network abstract layer (NAL) to which quad tree and triple tree partitioning are applied. The NAL unit to which the present invention is applied may include, for example, a video parameter set (VPS), a sequence parameter set (SPS), a picture parameter set (PPS), and at least one slice set (Slice).

For example, it is illustrated in FIG. 16 that a syntax element included in a sequence parameter set (SPS), but it is also possible to a picture parameter set (PPS) or a slice set (Slice) to include the syntax element. In addition, a syntax element to be commonly applied to sequence units or a picture unit may be included in a sequence parameter set (SPS) or a picture parameter set (PPS). On the other hand, a syntax element that is applied only to the slice is preferably included in a slice set (Slice). Therefore, this can be selected in consideration of encoding performance and efficiency.

A syntax element 'quad_split_flag' indicates whether a coding block is divided into four coding blocks. 'triple_split_flag' may indicate whether a coding block is divided into three coding blocks. When the coding block is divided into three coding blocks, 'is_hor_split_flag' indicating whether a partitioning direction of the coding block is vertical or horizontal may be signaled. When "is_hor_split_flag=1", it may mean a horizontal direction, and when "is_hor_split_flag=0", it may mean a vertical direction.

In addition, as another alternative, it is also possible to indicate whether triple tree partitioning is applied to a current block through 'isUseTripleTreeFlag', and to indicate whether a coding block is partitioned in a horizontal direction through a syntax element of 'triple_split_flag'. For example, when "hor_triple_flag=1", it may indicate that a coding block is partitioned in a horizontal direction, and when "hor_triple_flag=0", it may indicate that a coding block is partitioned in a vertical direction. Alternatively, instead of 'hor_triple_flag', ver_triple_flag indicating whether a coding block is partitioned in a vertical direction may be used in the same manner.

In addition, as a syntax element indicating whether asymmetric triple tree partitioning is allowed, 'asymmetric_triple_tree_flag' may be defined. For example, when "asymmetric_triple_tree_flag=1", it indicates that asymmetric triple tree partitioning is used, and when "asymmetric_triple_tree_flag=0", it indicates that asymmetric triple tree partitioning is not used. On the other hand, when triple tree partitioning is not used in a picture unit or a slice unit, a value may be set to 0 without signaling 'asymmetric_triple_tree_flag'.

Thus, through a combination of the syntax elements, it is possible to represent a partition type shown in FIGS. 14A to 14C. For example, if "isUseTripleTreeFlag=0", it means that a block is partitioned into four symmetric blocks as shown in a partition type of FIG. 14A.

In addition, when "isUseTripleTreeFlag=1" and "asymmetric_triple_tree_flag=0", it means any one of partition types of FIG. 14B. In this case, when "hor_triple_flag=1", it may means (2N/3)×2N partition type of FIG. 14B, and when "hor_triple_flag=0", it may mean 2N×(2N/3) partition type of FIG. 14B.

In addition, when "isUseTripleTreeFlag=1" and "asymmetric_triple_tree_flag=1", it means any one of partition types of FIG. 14C. At this time, when "hor_triple_flag=1", it may mean a partition type illustrated in a left side of FIG. 14C, and when "hor_triple_flag=0", it may mean a partition type illustrated in a right side of FIG. 14C.

In addition, as another alternative, each partition types of FIGS. 14A to 14C may be represented as index by 'asymmetric_tripletree_partition_index'.

FIGS. 17A to 17I are diagrams illustrating a partition type in which multi-tree partitioning is allowed according to another embodiment of the present invention.

A method of partitioning a CTU or CU using at least one of the above-described quad tree partitioning, binary partitioning, or triple tree partitioning may be referred to multi-tree partitioning (or multi tree CU partitioning). A CTU or CU can be partitioned using any N partitions among the above mentioned examples. Specifically, for example, as shown in FIGS. 17A to 17I, a CTU or CU may be partitioned using 9 partitioning types.

For a unit of a sequence or a picture, partitioning may be performed by using all of quad tree partitioning, binary tree partitioning, and triple tree partitioning or partitioning may be performed by using one or two of quad tree partitioning, binary tree partitioning, or triple tree partitioning.

It is also possible to use quad tree partitioning as default, and to use binary tree partitioning and triple tree partitioning selectively. At this time, it is possible to signal whether to use binary tree partitioning and/or triple tree partitioning through a sequence parameter set or picture parameter set.

Alternatively, it is also possible to use quad tree partitioning and triple tree partitioning as default, and to use binary tree partitioning selectively. For example, a syntax isUseBinaryTreeFlag indicating whether binary tree partition is used may be signaled in a sequence header. If a value of the isUseBinaryTreeFlag is 1, a CTU or CU in the current sequence can be partitioned using binary tree partitioning. It is also possible to signal a syntax isUseTripleTreeFlag indicating whether triple tree partitioning is used through a sequence header. If a value of the isUseTripleTreeFlag is 1, a CTU or CU in the current sequence header may be partitioned using triple tree partitioning.

Figure 17A:
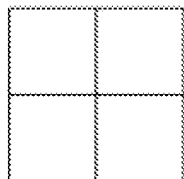
FIGS. 17A to 17I are diagrams illustrating a partition type in which multi-tree partitioning is allowed according to another embodiment of the present invention.
Figure 17B:
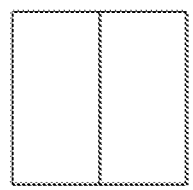
Figure 17C:
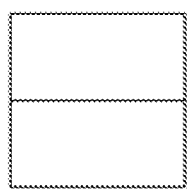
Figure 17D:
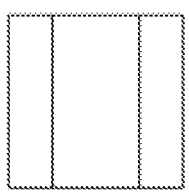
Figure 17E:
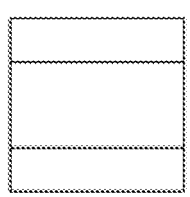
Figure 17F:
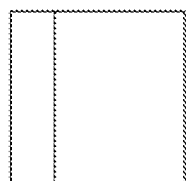
Figure 17G:
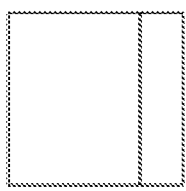
Figure 17H:
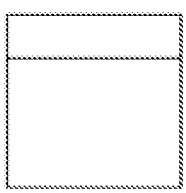
Figure 17I:
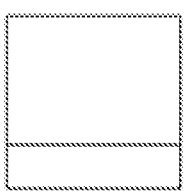

Partition shapes partitioned by multi-tree partitioning can be limited to 9 basic partitions shown in, for example, FIGS. 17A to 17I. FIG. 17A shows a quad partition type, 17B to 17C show symmetric binary tree partition types, 17D to 17E show triple tree partition types and 17F to 17I show asymmetric binary tree partition types. The detailed description relating to each partition type illustrated in FIGS. 17A to 17I are omitted since they are identical to above described.

Figure 18A:
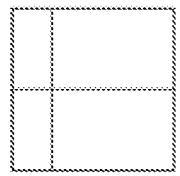
FIGS. 18A to 18L are diagrams illustrating an extended partition type in which multi-tree partitioning is allowed as another embodiment to which the present invention is applied.
Figure 18B:
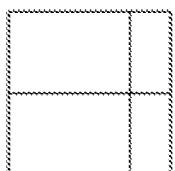
Figure 18C:
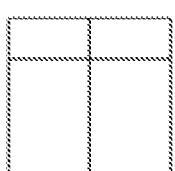
Figure 18D:
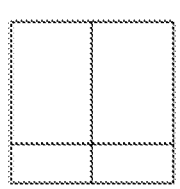
Figure 18E:
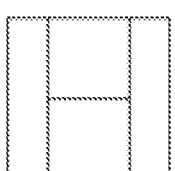
Figure 18F:
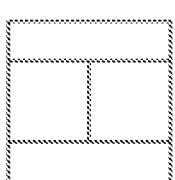
Figure 18G:
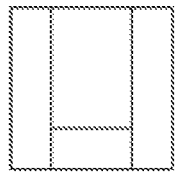
Figure 18H:
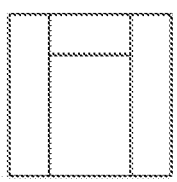
Figure 18I:
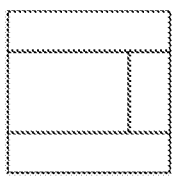
Figure 18J:
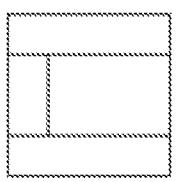
Figure 18K:
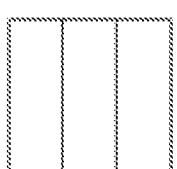
Figure 18L:

In addition, as another alternative, partition types divided by multi-tree partitioning may be extended to further include 12 partitions illustrated in FIGS. 18A to 18L. FIGS. 18A to 18D show an asymmetric quad tree partition types, FIGS. 18E to 18J show partition types of asymmetric quad tree partitioning of three types, and FIGS. 18K to 18L show partition types of symmetric triple tree partitioning. Each partition type shown in FIGS. 18A to 18L are the same as described above, thus, a detailed description thereof will be omitted.

Figure 19:
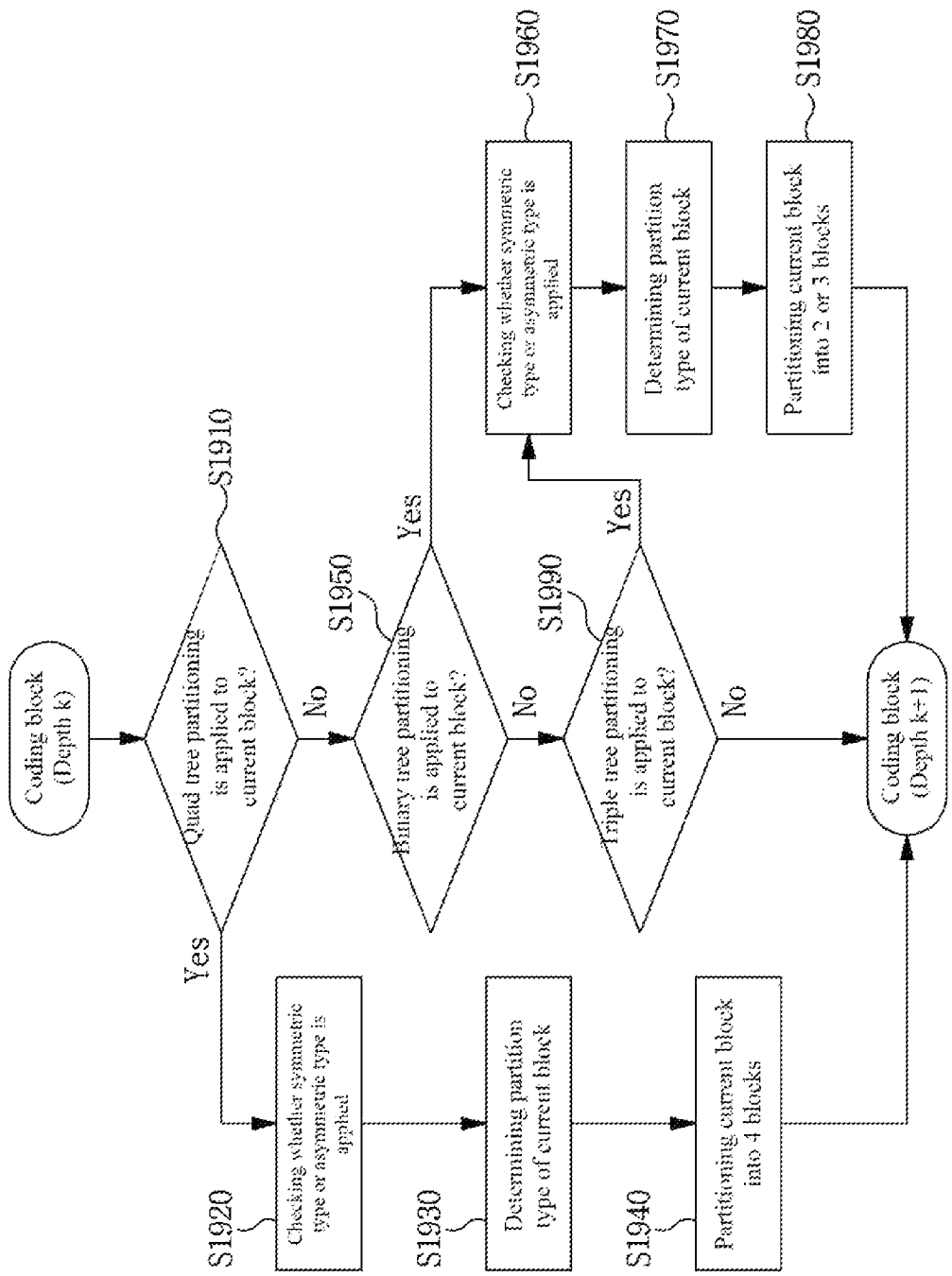
FIG. 19 is a flowchart illustrating coding block partitioning method based on multi-tree partitioning as another embodiment to which the present invention is applied.

FIG. 19 is a flowchart illustrating coding block partitioning method based on multi-tree partitioning as another embodiment to which the present invention is applied.

Assume that a depth k coding block is divided into a depth k+1 coding block. First, it is determined whether quad tree partitioning is applied to a current block at depth k S1910. If the quad tree partitioning is not applied, it is determined whether binary tree partitioning is applied to the current block S1950. In addition, if binary tree partitioning is not applied, it is determined whether triple tree partitioning is applied to the current block S1990. As a result of determination at S1950, if triple tree partitioning is not applied, the current block becomes a depth k+1 coding block without partitioning.

Here, as a result of the determination of step S1910, if quad tree partitioning is applied, it is checked whether symmetric or asymmetric quadtree partitioning is performed S1920. Thereafter, partition information is checked to determine a block partition type of the current block S1930, and the current block is divided into four blocks according to the determined partition type S1940. For example, when the symmetric quad tree is applied, the block is divided into a partition type of FIG. 17A. In addition, when the asymmetric quad tree is applied, the block is divided into any one of partition types of FIGS. 18A to 18D. Alternatively, when asymmetric quad tree partitioning of three type is applied, the block is divided into any one of partition types of FIGS. 18E to 18J. However, as described above, if only a basic partition type of FIGS. 17A to 17I are available as a multi-tree partition type, only the symmetric square block of FIG. 17A may be applied without determining whether the quad tree is asymmetric.

In addition, as a result of the determination of step S1950, if binary tree partitioning is applied, it is checked whether symmetric or asymmetric binary tree partitioning is performed S1960. Thereafter, a block partition type of the current block is determined by checking partition information S1970, and the current block is divided into two blocks according to the determined partition type S1980. For example, when a symmetric binary tree is applied, the block is divided into any one of partition types of FIGS. 17B and 17C. In addition, when an asymmetric binary tree is applied, the block is divided into any one of partition types of FIGS. 17F to 17I.

In addition, as a result of the determination of step S1990, if triple tree partitioning is applied, it is checked whether symmetric or asymmetric triple tree partitioning is performed S1960. Thereafter, a block partition type of the current block is determined by checking partition information S1970, and the current block is divided into three blocks according to the determined partition type S1980. For example, when an asymmetric triple tree is applied, the block is divided into any one of partition types of FIGS. 17D and 17E. In addition, when a symmetric binary tree is applied, the block is divided into any of partition types of FIGS. 18K to 18L. However, as described above, if only a basic partition type of FIGS. 17A to 17I are available for the multi-tree partition type, only the pre-defined asymmetric triple block in FIGS. 17D and 17E can be applied without determining whether the triple tree is asymmetric.

As a syntax element representing multi-tree partitioning, 'is_used_Multitree_flag' indicating whether multi-tree partitioning is performed may be defined. In addition, it is possible to use the syntax elements shown and described with reference to FIGS. 10, 13, and 16 as information for determining a multi-tree partition type.

For example, a merge coding unit may be generated by merging a plurality of neighboring coding units. At this time, any one of the plurality of coding units will be referred to as a merge candidate coding unit. The merge candidate coding unit may mean a coding unit that have a first in a scanning order among the plurality of coding units. Or, it may mean a coding unit located in a specific direction among the plurality of coding units. The specific direction may mean the leftmost, topmost or center position.

Figure 21:
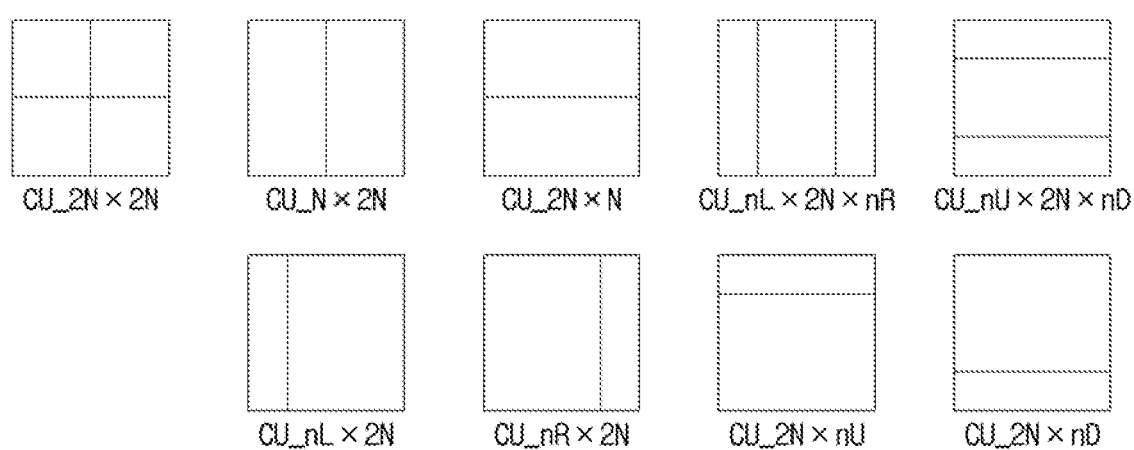
FIGS. 21, 22A and 22B illustrate examples of types of coding units to explain a merge coding unit.

Referring to FIG. 21, it is illustrated 9 types of CUs to which the above-described multi-tree partitioning is applied, and each CU may be referred to as CU_2N×2N, CU_N×2N, CU_2N×N, CU nL×2N×nR, CU_nU×2N×nD, CU_nL×2N, CU_nR×2N, CU_2N×nU and CU_2N×nD, respectively. In this regard, partition types including at least three partitioned coding units among the 9 types of CUs, for example, CU_2N×2N, CU_nL×2N×nR, and CU_nU×2N×nD, may be selected as merge target coding units. On the other hands, as another alternatively, partition types including at least n (n≥2) coding units among the types of CUs may be selected as the merge target coding units.

Figure 20:
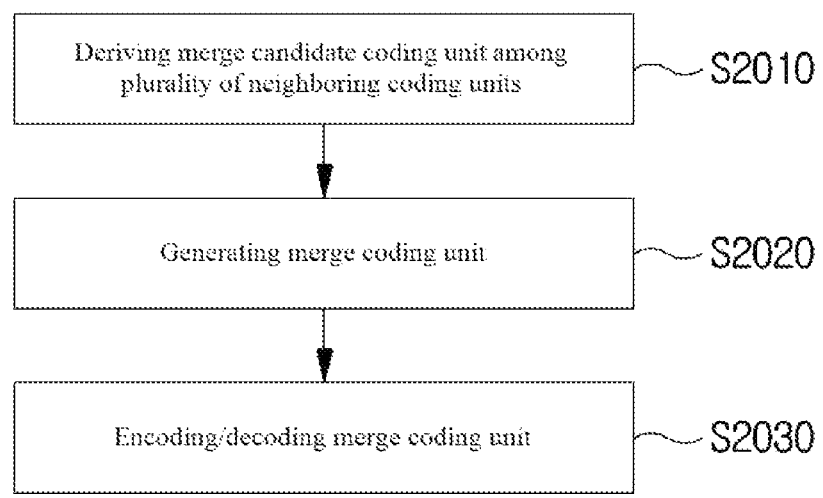
FIG. 20 is a flowchart illustrating a method of generating and encoding/decoding a merge coding unit as an embodiment to which the present invention is applied.

Next, referring to FIG. 20, a merge coding unit is generated using the merge candidate coding unit S2020.

Figure 22A:
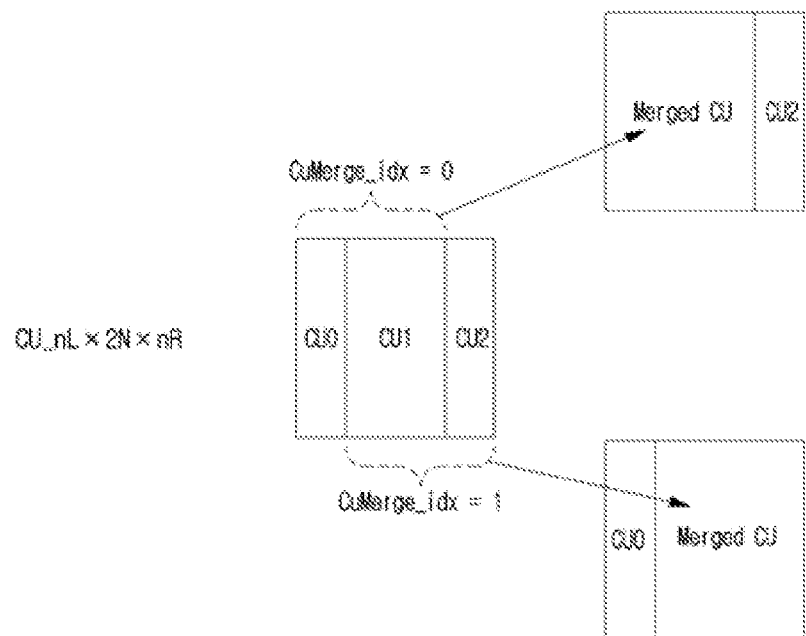

For example, for a CU_nL×2N×nR generated by the triple tree partitioning described above, any one of three coding units CU0, CU1, and CU2 vertically neighboring thereto may be a merge candidate coding unit. In this regard, FIG. 22A illustrates a process of generation of two types of merge coding units from a CU_nL×2N×nR coding unit. A merge coding unit (merged CU) may be generated by merging CU0 and CU1 among three of CU0, CU1 and CU2 of which constituting the CU_nL×2N×nR or by merging CU1 and CU2.

Meanwhile, information specifying a coding unit to be merged may be signaled. The information may be encoded in a form of a flag or index relating to a location of the coding unit to be merged. For example, the syntax element CuMerge_idx may be defined as follows to distinguish the merged coding unit (merged CU). That is, when the syntax element CuMerge_idx value is '0', it is defined that first two coding units in a coding order among partitioned coding units are merged. And when the syntax element CuMerge_idx value is '1', it is defined that last two coding units in a coding order are merged.

Figure 22B:
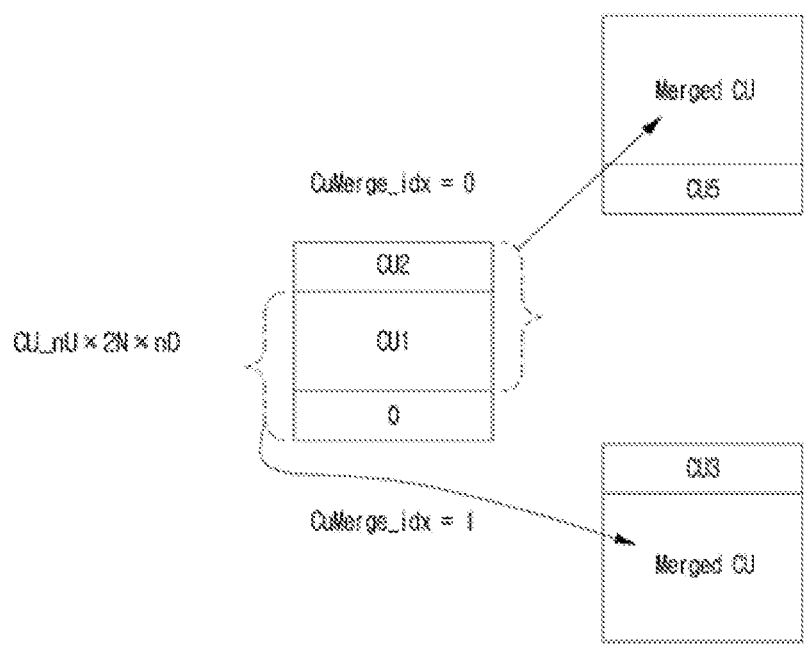

In addition, for example, for a CU_nU×2N×nD generated by the triple tree partitioning described above, any one of three coding units (CU3, CU4, CU5) horizontally neighboring thereto may be a merge candidate coding unit. In this regard, FIG. 22B illustrates a process of generation of two types of merge coding unit from a CU_nU×2N×nD coding unit. A merge coding unit (merged CU) is generated by merging CU3 and CU4 among three of CU3, CU4, and CU5 of which constituting the CU_nU×2N×nD, or by merging CU4 and CU5. In addition, as described above, to distinguish a merged CU to be generated, a value of a syntax element CuMerge_idx may be set to 0 when first two coding units in a coding order among partitioned coding units are merged, and a value of a syntax element CuMerge_idx may be set to 1 when last two coding units in a coding order are merged.

Finally, referring to FIG. 20, encoding or decoding is performed on the generated merge coding unit S2030. For example, a merge candidate coding unit coding parameter, motion data, and/or texture data may be used in the encoding/decoding process (i.e., a prediction, a transform, a quantization, etc.) of the merge coding unit. For example, a motion vector, a reference picture index, an intra mode, an intra reference sample, etc. of the merge candidate coding unit may be used as a motion vector, a reference picture index, an intra mode, an intra reference sample, etc. of the merge coding unit.

Figure 23:
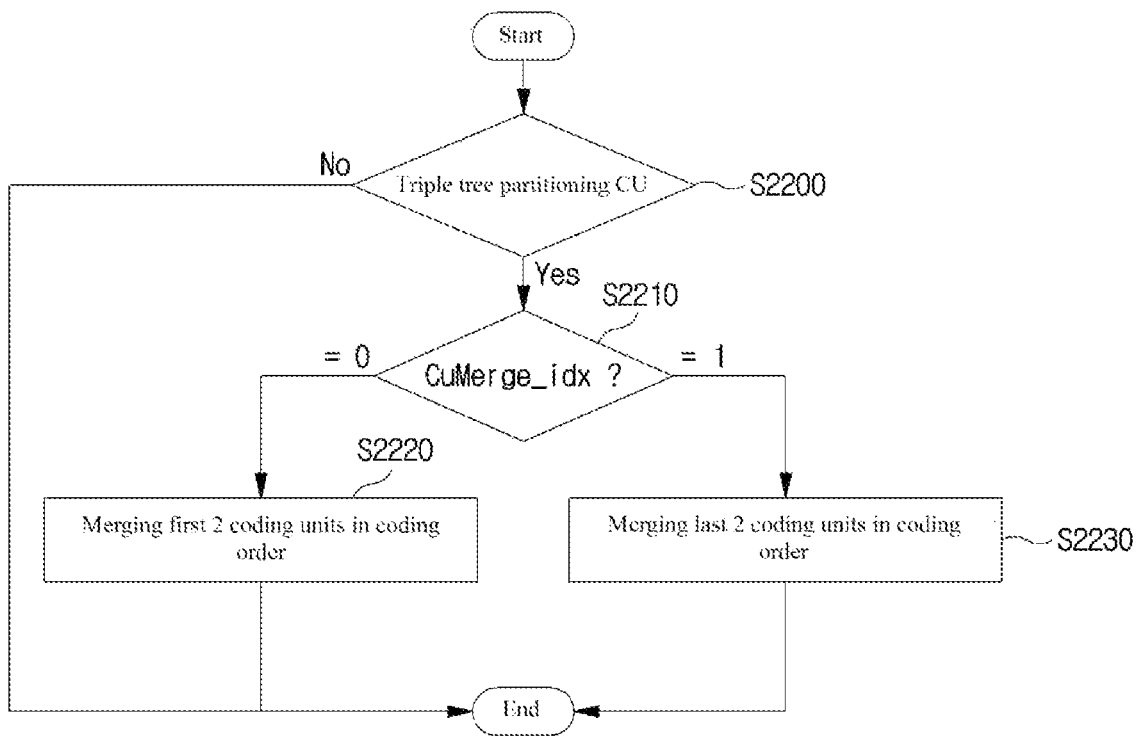
FIG. 23 is a flowchart illustrating a video encoding or decoding method using a value of a syntax element CuMerge_idx.

FIG. 23 is a flowchart illustrating a video encoding or decoding method using a value of a syntax element CuMerge_idx.

First, it is checked whether a current coding block is divided into three coding units by triple tree partitioning S2200. If it is divided into three coding units, a value of CuMerge_idx is checked S2210. When "CuMerge_idx=0", a merged coding unit is generated by merging first two coding units in a coding order for coding blocks S2220. On the other hand, when "CuMerge_idx=1", a merged coding unit is generated by merging last two coding units in a coding order for coding blocks S2230.

However, the present invention is not limited to the example shown in FIG. 23. That is, for example, in the case of 4 CUs divided by quad tree partitioning, a merge coding unit (merged CU) may be distinguished by additionally defining values of CuMerge_idx. For example, when "CuMerge_idx=0", it may be defined that first two coding units in a coding order are merged, when "CuMerge_idx=1", it may be defined that first and third coding units in the coding order are merged, and when "CuMerge_idx=2", it may be defined that second and fourth coding units in the coding order are merged.

Tables 3 and 4 show syntax elements that determine a type of a coding unit to which multi-tree partitioning (quad tree partitioning, binary partitioning, and triple tree partitioning) is applied, as shown in FIG. 21.

In addition to the syntax element CuMerge_idx, another syntax element CU_merge_flag may be signaled. If a value of Cu_merge_flag is '1', it indicates that a neighboring coding block and a current coding block are merged. Here, the merge may mean a process of generating a new type of coding unit by merging a plurality of coding units. Alternatively, it may be regarded as a process of re-determining a partition type by merging some of a plurality of coding units partitioned by multi-tree partitioning.

Accordingly, by using the syntax elements CuMerge_idx and CU_merge_flag, partition types of coding blocks by multi-tree partitioning may be distinguished and defined. For example, the following description will be given in detail with the codewords shown in Table 3 or Table 4 below.

First, a triple tree partitioned coding unit CU_nLx2NxnR and CU_nUx2NxnD can be re-generated into coding units of CU_nLx2N, CU_nRx2N, CU_2NxnU or CU_2NxnD by applying the merge coding unit scheme as shown in FIGS. 22A and 22B. In a more general sense, non-square vertical direction binary tree partitioning can be made by using the coding unit merge scheme from vertical direction triple tree partitioning (e.g., FIG. 22A). In addition, non-square horizontal direction binary tree partitioning can be made by using the coding unit merge scheme from horizontal direction triple tree partitioning (e.g., FIG. 22B).

That is, coding units CU_nLx2N, CU_nRx2N, CU_2NxnU, and CU_2NxnD have the same shape as the coding units generated by applying the merge scheme to the coding unit CU_nLx2NxnR or CU_nUx2NxnD. Therefore, it is possible to distinguish the coding units by using CU_merge_flag indicating whether it is merged and CuMerge_idx indicating a merge type or direction.

For example, referring to Tables 3 and 4, codewords of CU_nLx2N and CU_nRx2N coding units (e.g., Table 3-'0001' and Table 4-'001') are set to the same as a codeword of CU_nLx2NxnR (e.g., Table 3-'0001' and Table 4-'001'), and are distinguished by the above-described CuMerge_idx and Cu_merge_flag values. Similarly, codewords of CU_2NxnU and CU_2NxnD coding units (e.g., Table 3-'0000', Table 4-'000') are set to the same as a codeword of CU_nUx2NxnD (e.g., Table 3-'0000', Table 4-' of CU_nUx2NxnD. 000'), but they are distinguished by the above-described CuMerge_idx and Cu_merge_flag values. Therefore, encoding and decoding efficiency can be increased by utilize codewords efficiently.

TABLE 3

| Partitioning index | CU partitioning | Codeword | CU_merge_flag | CuMerge_idx |
|---|---|---|---|---|
| 0 | CU_2Nx2N | 1 | — | — |
| 1 | CU_Nx2N | 01 | — | — |
| 2 | CU_2NxN | 001 | — | — |
| 3 | CU_nLx2NxnR | 0001 | 0 | — |
| 4 | CU_nUx2NxnD | 0000 | 0 | — |
| 5 | CU_nLx2N | 0001 | 1 | 1 |
| 6 | CU_nRx2N | 0001 | 1 | 0 |
| 7 | CU_2NxnU | 0000 | 1 | 1 |
| 8 | CU_2NxnD | 0000 | 1 | 0 |

TABLE 4

| Partitioning Index | CU partitioning | Codeword | CU_merge_flag | CuMerge_idx |
|---|---|---|---|---|
| 0 | CU_2Nx2N | 1 | — | — |
| 1 | CU_Nx2N | 011 | — | — |
| 2 | CU_2NxN | 010 | — | — |
| 3 | CU_nLx2NxnR | 001 | 0 | — |
| 4 | CU_nUx2NxnD | 000 | 0 | — |
| 5 | CU_nLx2N | 001 | 1 | 1 |
| 6 | CU_nRx2N | 001 | 1 | 0 |
| 7 | CU_2NxnU | 000 | 1 | 1 |
| 8 | CU_2NxnD | 000 | 1 | 0 |

Figure 24:
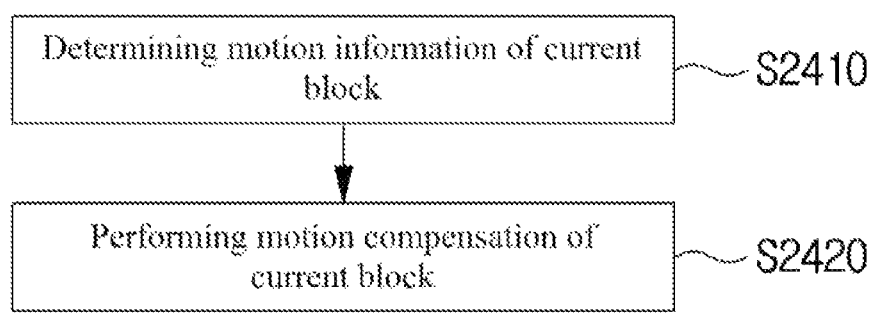
FIG. 24 is a flowchart illustrating an inter prediction method as an embodiment to which the present invention is applied.

FIG. 24 is a flowchart illustrating an inter prediction method as an embodiment to which the present invention is applied. Steps of determining motion information of a current block S2410, and performing motion compensation of the current block by using the determined motion information S2420 are included in FIG. 24. Hereinafter, the steps will be described in detail.

First, referring to FIG. 24, motion information of the current block may be determined S2410. The motion information of the current block may include at least one of a motion vector of the current block, a reference picture index of the current block, or an inter prediction direction of the current block.

The motion information of the current block may be obtained based on at least one of information signaled through a bitstream or motion information of a neighboring block adjacent to the current block.

Figure 25:
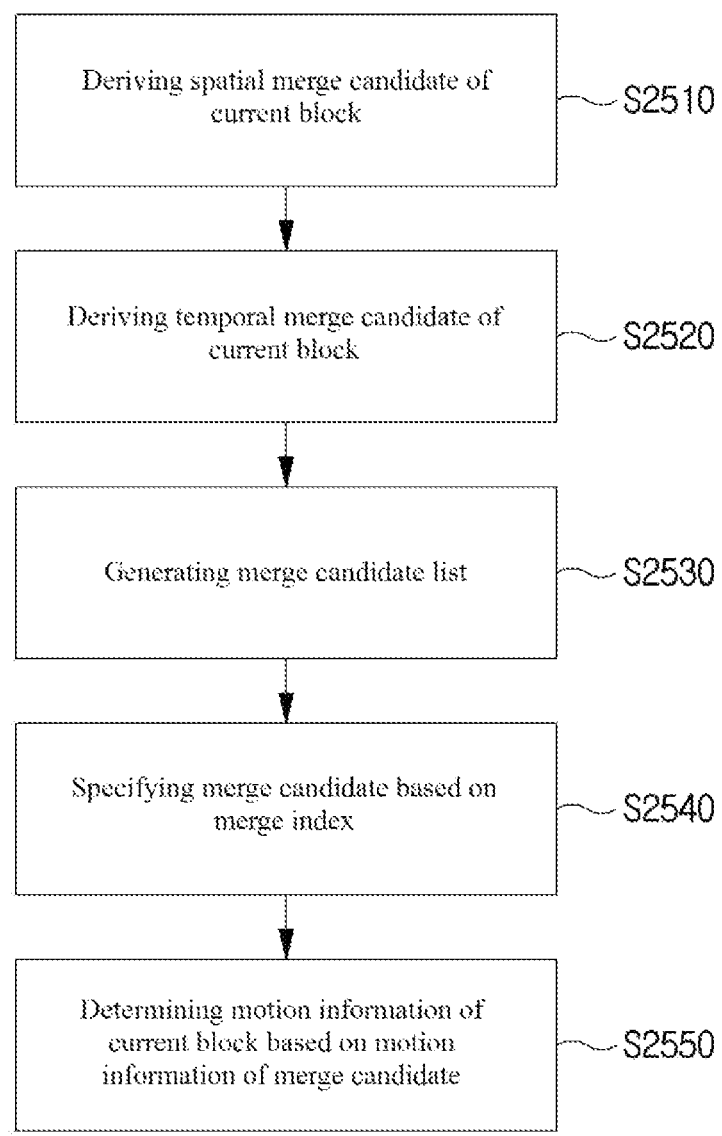
FIG. 25 is a diagram illustrating a process of deriving motion information of a current block when a merge mode is applied to the current block.
Figure 26:
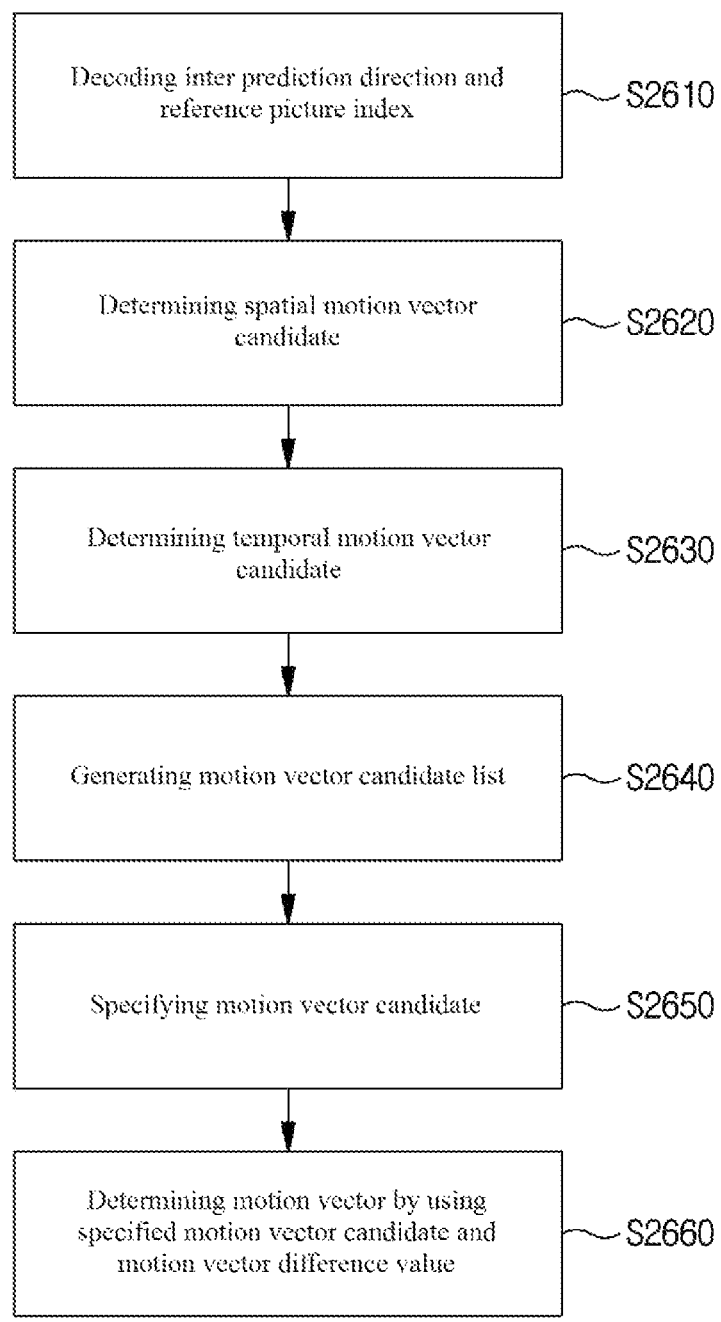
FIG. 26 is a diagram illustrating a process of deriving motion information of a current block when an advanced motion vector predictor (AMVP) mode is applied to the current block.

In this regard, FIG. 25 is a diagram illustrating a process of deriving motion information of a current block when a merge mode is applied to the current block. On the other hand, FIG. 26 is a diagram illustrating a process of deriving motion information of a current block when an advanced motion vector predictor (AMVP) mode is applied to the current block.

First, a case in which a merge mode is applied to a current block will be described with reference to FIG. 25. A spatial merge candidate may be derived from a spatial neighboring block of the current block S2510. The spatial neighboring block may include at least one of a block adjacent to a top, left, or corner (e.g., at least one of a top left corner, a top right corner, or a bottom left corner) of the current block.

Motion information of the spatial merge candidate may be set to be the same as motion information of the spatial neighboring block.

A temporal merge candidate may be derived from a temporal neighboring block of the current block S2520. The temporal neighboring block may mean a co-located block included in a collocated picture. The collocated picture has a temporal order (Picture Order Count, POC) different from the current picture including the current block. A picture having a predefined index in a reference picture list may be determined as the collocated picture, or the collocated picture is determined by an index signaled through the bitstream. A block included in a block having the same position and size as the current block in the collocated picture or a block adjacent to a block having the same position and size as the current block in the collocated picture may be determined as the temporal neighboring block. For example, at least one of a block including a center coordinate of a block having the same position and size as the current block in the collocated picture, or a block adjacent to a right bottom boundary of the block may be determined as the temporal neighboring block.

Motion information of the temporal merge candidate may be determined based on motion information of the temporal neighboring block. For example, a motion vector of the temporal merge candidate may be determined based on a motion vector of the temporal neighboring block. In addition, an inter prediction direction of the temporal merge candidate may be set to be the same as an inter prediction direction of the temporal neighboring block. However, a reference picture index of the temporal merge candidate may have a fixed value. For example, the reference picture index of the temporal merge candidate may be set to '0'.

Thereafter, a merge candidate list including the spatial merge candidate and the temporal merge candidate may be generated S2530. If the number of merge candidates included in the merge candidate list is less than a maximum number of merge candidates, a combined merge candidate generated by combining two or more merge candidates or a merge candidate having a zero motion vector (0, 0) may be included in the merge candidate list.

When the merge candidate list is generated, at least one of merge candidates included in the merge candidate list may be specified based on a merge candidate index S2540.

Motion information of the current block may be set to be the same as motion information of a merge candidate specified by the merge candidate index S2550. For example, when the spatial merge candidate is selected by the merge candidate index, the motion information of the current block may be set to be the same as the motion information of the spatial neighboring block. Alternatively, when the temporal merge candidate is selected by the merge candidate index, the motion information of the current block may be set to be the same as the motion information of the temporal neighboring block.

On the other hand, with reference to FIG. 26, a case in which the AMVP mode is applied to the current block will be described. From the bitstream, at least one of an inter prediction direction or a reference picture index of the current block may be decoded S2610. That is, when the AMVP mode is applied, at least one of the inter prediction direction or the reference picture index of the current block may be determined based on information encoded in the bitstream.

A spatial motion vector candidate may be determined based on a motion vector of a spatial neighboring block of the current block S2620. The spatial motion vector candidate may include at least one of a first spatial motion vector candidate derived from a top neighboring block of the current block and a second spatial motion vector candidate derived from a left neighboring block of the current block. Here, the top neighboring block may include at least one of blocks adjacent to a top or top right corner of the current block, and the left neighboring block of the current block may include at least one of blocks adjacent to a left or bottom left corner of the current block. The block adjacent to the top left corner of the current block may be treated as the top neighboring block, or may be treated as the left neighboring block.

If a reference picture of the current block and a reference picture of the spatial neighboring block are different, a spatial motion vector may be obtained by scaling the motion vector of the spatial neighboring block.

A temporal motion vector candidate may be determined based on a motion vector of a temporal neighboring block of the current block S2630. If a reference picture of the current block and a reference picture of the temporal neighboring block are different, a temporal motion vector may be obtained by scaling the motion vector of the temporal neighboring block.

A motion vector candidate list including the spatial motion vector candidate and the temporal motion vector candidate may be generated S2640.

When the motion vector candidate list is generated, at least one of motion vector candidates included in the motion vector candidate list may be specified based on information specifying at least one of motion vector candidate lists S2650.

The motion vector candidate specified by the information may be set as a motion vector prediction value of the current block, and then a motion vector difference value is added to the motion vector prediction value to obtain a motion vector of the current block S2660. In this case, the motion vector difference value may be parsed from the bitstream.

Referring back to FIG. 24, when motion information of the current block is obtained, motion compensation for the current block may be performed based on the obtained motion information S2420. Specifically, motion compensation for the current block may be performed based on the inter prediction direction, the reference picture index, and the motion vector of the current block.

As in the above example, based on the motion information of the current block, motion compensation for the current block may be performed. In this case, the motion vector may have a precision (or resolution) of an integer pixel unit or a decimal pixel unit.

The integer pixel unit may include N integer pel such as an integer pel, two integer-pel, four integer-pel, and the like. Here, N is a natural number of 1 or more, in particular, it may be represented by an exponential power of 2. The integer pel may represent a precision of one pixel (i.e., one pixel unit), the two integer-pel may represent a precision of two pixels (i.e. two pixels unit), and the four integer-pel may represent a precision of four pixels (i.e. four pixels unit). According to the selected integer pel, a motion vector may be expressed in units of N pixels, and motion compensation may be performed in units of N pixels.

The decimal pixel unit may include 1/N pel such as half-pel, quarter-pel, octo-pel, and the like. Here, N is a natural number of 1 or more, in particular, it may be represented by an exponential power of 2. The half pel may represent a precision of ½ pixel (i.e., ½ pixel unit), the quarter pel may represent a precision of ¼ pixel (i.e., ¼ pixel unit), and the octo pel may represent a precision of ⅛ pixel (i.e., ⅛ pixel unit). According to the selected decimal pel, a motion vector may be expressed in units of 1/N pixel, and motion compensation may be performed in units of 1/N pixel.

Figure 27:
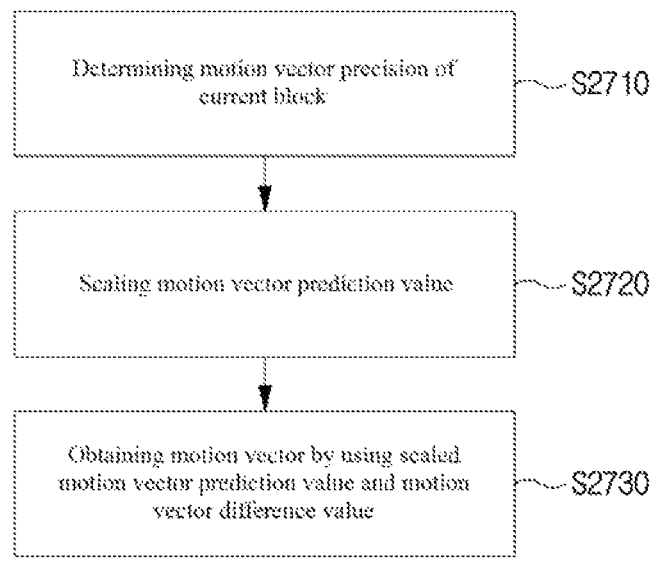
FIGS. 27 and 28 are diagrams illustrating a motion vector derivation method according to a motion vector precision of a current block.
Figure 28:
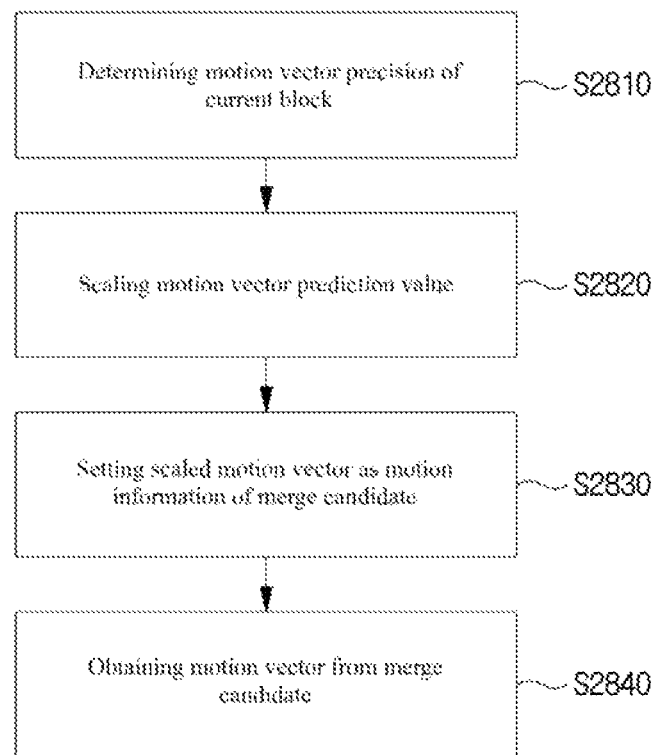

FIGS. 27 and 28 are diagrams illustrating a motion vector derivation method according to a motion vector precision of a current block. FIG. 27 illustrates a motion vector derivation method under an AMVP mode, and FIG. 28 illustrates a motion vector derivation method under a merge mode.

First, a motion vector precision of the current block may be determined S2710, S2810.

A motion vector precision may be determined in a unit of a sequence, a picture, a slice or a block. Here, the block may indicate a CTU, a CU, a PU, or a block having a predetermined size/shape. The CTU may mean a CU having a maximum size allowed by the encoder/decoder. When a motion vector precision is determined at a higher level than a block such as a sequence, a picture, or a slice, motion compensation for the block may be performed according to the motion vector precision determined at the higher level. For example, motion compensation for blocks included in a first slice is performed using motion vectors in an integer-pel unit, while motion compensation for blocks included in a second slice is performed using motion vectors in a quarter-pel unit.

To determine the precision of motion vector, information for determining the precision of motion vector may be signaled via the bitstream. The information may be index information 'mv_resolution_idx' for identifying at least one of a plurality of motion vector precisions. For example, Table 5 shows motion vector precisions according to my_resolution_idx.

TABLE 5

| mv_resolution_idx | Motion vector pixel unit |
|---|---|
| 0 | Quarter pel pixel unit |
| 1 | Half pexl pixel unit |
| 2 | Integer-pel pixel unit |
| 3 | Octo pel pixel unit |
| 4 | Two integer-pel pixel unit |
| 5 | Four integer-pel pixel unit |

Table 5 is merely an example to which the present invention can be applied. Types and/or number of motion vector precision candidates that may have in a predetermined unit may be different from those shown in Table 5. Values and/or range of my_resolution_idx may also differ depending on types and/or number of motion vector precision candidates. As another example, a motion vector precision may be derived from a unit spatially or temporally adjacent to a predetermined unit. Here, the predetermined unit may indicate a picture, a slice, a block, or the like, and the adjacent unit may indicate a picture, a slice, a block, or the like that is spatially or temporally neighbored to the predetermined unit. For example, a motion vector precision of the current block may be set equal to a motion vector precision of a block indicated by index information among a spatial neighboring block and/or temporal neighboring block of the current block.

As another example, a motion vector precision of the current block may be adaptively determined according to motion information of the current block. For example, a motion vector precision of the current block may be determined adaptively depending on whether a temporal order or output order (POC) of the reference picture of the current block precedes a temporal order or output order (POC) of the current picture, whether a temporal order or output order of the reference picture of the current block is later than a temporal order or output order (POC) of the current picture, or whether a reference picture of the current block is the current picture.

A part of a plurality of motion vector precision candidates may be selectively used. For example, after defining a motion vector precision set including at least one motion vector precision candidate, at least one of motion vector precision candidates included in the motion vector precision set may be determined as a motion vector precision.

The motion vector precision set may be determined in a unit of a sequence, a slice or a block. Motion vector precision candidates included in the motion vector precision set may be predefined in the encoder and the decoder. Alternatively, the motion vector precision set may be determined based on encoding information signaled through the bitstream. Here, the encoding information may be related to at least one of a type and/or number of motion vector precision candidates included in the motion vector precision set. As another example, the motion vector precision set may be derived from a unit spatially or temporally adjacent to a predetermined unit. Here, the predetermined unit may indicate a picture, a slice, a block, or the like, and the adjacent unit may indicate a picture, a slice, a block, or the like that is spatially or temporally neighbored to the predetermined unit. For example, a motion vector precision set of a predetermined slice may be set equal to a motion vector precision set of a slice spatially adjacent to the slice. Alternatively, depending on dependency between slices, a motion vector precision set of an independent slice may be set to a motion vector precision set of a dependent slice.

Once the motion vector precision set is determined, at least one motion vector precision candidate included in the motion vector precision set may be determined as a motion vector precision. To this end, index information identifying at least one of motion vector precision candidates included in the motion vector precision set may be signaled through the bitstream. For example, a candidate identified by index information among motion vector precision candidates included in the motion vector precision set may be set as a motion vector precision of the current block.

Whether to use a motion vector precision set may be adaptively determined according to a slice type, a size/shape of the current block, motion information of the current block (e.g., a reference picture of the current block or a prediction direction of the current block), or the like. Alternatively, information (e.g., a flag) indicating whether a motion vector precision set is used may be signaled via the bitstream.

When a motion vector precision set is determined at a higher level than a block such as a sequence, a picture, or a slice, a motion vector precision of a predetermined block may be derived from a motion vector precision set determined at the higher level. For example, if a motion vector set including a quarter pel and two integer-pel is defined at a picture level, blocks included in that picture may be restricted to use at least one of the quarter pel or two integer-pel.

When multi-directional prediction is applied to the current block, a plurality of motion vectors according to the multi-directional prediction may have different motion vector precisions. That is, a precision of any one of a plurality of motion vectors of the current block may be different from a precision of another motion vector. For example, when Bi-Prediction is applied to the current block, a precision of a forward motion vector mvL0 may be different from a precision of a backward motion vector mvL1. Even when a prediction with more than three directions is applied to the current block, at least one of a plurality of motion vectors may have a precision different from another motion vector. Accordingly, information for determining a motion vector precision can be encoded/decoded for each prediction direction of the current block.

When an AMVP mode is applied to the current block and a motion vector precision is variably determined for each block, there may be occurred that a motion vector precision of a motion vector prediction value (Motion Vector Predictor, MVP) derived from a neighboring block is different from a motion vector precision of the current block. In order to match the motion vector precision of the motion vector prediction value to the motion vector precision of the current block, the motion vector prediction value may be scaled according to the motion vector precision of the current block S2720. The motion vector prediction value may be scaled to match it with the motion vector precision of the current block. A motion vector difference value (MVD) may be added to the scaled motion vector prediction value to derive a motion vector of the current block S2730.

For example, when a motion vector pixel unit of a neighboring block is a quarter pel and a motion vector pixel unit of the current block is an integer pel, the motion vector prediction value derived from the neighboring block may be scaled in the integer pel unit, and then a motion vector in the integer pel unit may be obtained by adding the scaled motion vector prediction value and the motion vector difference value. For example, Equation 1 below shows an example in which a motion vector is obtained by scaling a motion vector prediction value in an integer pel unit.

$$mvLX[0]=((mvpLX[0]>>2)+mvdLX[0]<<2$$

$$mvLX[1]=((mvpLX[1]>>2)+mvdLX[1]<<2 \quad \text{[Equation 1]}$$

In the Equation 1, mvpLX represents a motion vector prediction value, and mvdLX represents a motion vector difference value. In addition, mvLX[0], mvpLX[0], and mvdLX[0] represent motion vector components in a vertical direction, and mvLX[1], mvpLX[1], and mvdLX[1] represent motion vector components in a horizontal direction.

As another example, when a motion vector pixel unit of a neighboring block is two integer-pel and a motion vector pixel unit of the current block is a quarter pel, a motion vector prediction value derived from the neighboring block may be scaled in the quarter pel unit, and a motion vector in the quarter pel unit may be obtained by adding the scaled motion vector prediction value and a motion vector difference value. For example, Equation 2 below shows an example in which a motion vector is obtained when a current picture is used as a reference picture.

$$mvLX[0]=(mvpLX[0]>>3+mvdLX[0])<<3$$

$$mvLX[1]=(mvpLX[1]>>3+mvdLX[1])<<3 \quad \text{[Equation 2]}$$

In Equations 1 and 2, a bit shift value used to scale the motion vector prediction value may be adaptively determined according to a magnification between a motion vector precision of the current block and a motion vector precision of the neighboring block.

Unlike the example shown in FIG. 27, it is also possible to scale a motion vector generated by adding a motion vector prediction value and a motion vector difference value, to match it with a motion vector precision of the current block.

A motion vector difference value may be encoded/decoded according to a motion vector precision of the current block. For example, when the motion vector precision of the current block is a quarter pel, the motion vector difference value for the current block may be encoded/decoded in a quarter pel unit.

It is also possible to encode/decode a motion vector difference value in a predetermined unit regardless of a motion vector precision of the current block. Here, the predetermined unit may be a fixed pixel unit (for example, an integer pel or a quarter pel) that is previously promised by the encoder and the decoder, or a pixel unit that is determined at a higher level such as a picture or a slice. If a motion vector precision of the current block and a motion vector precision of the motion vector difference are different, a motion vector of the current block may be derived by scaling a motion vector difference value, or by scaling a motion vector derived by adding a scaled motion vector prediction value and a motion vector difference value. For example, if a motion vector precision of the current block is an integer pel, while a motion vector difference value is in a quarter pel precision, a motion vector of the current block may be derived by scaling a motion vector derived by adding a scaled motion vector prediction value and a motion vector difference value, as shown in Equation 1.

According to a motion vector precision, a method of encoding/decoding a motion vector difference value may be differently determined. For example, in the case of a decimal pel pixel unit, a motion vector prefix part may represent an integer part of a motion vector, and a suffix part may represent a fractional part of the motion vector. For example, Equation 3 below shows an example of deriving a prefix part 'predfix_mvd' and a suffix part 'suffix_mvd'.

$$prefix\_mvd=MVD/N$$

$$suffix\_mvd=MVD \% N \quad \text{[Equation 3]}$$

In Equation 3, N may be a fixed value or may be a value variably determined according to a motion vector precision of the current block. For example, N may be a value in proportion to a motion vector precision of the current block.

When a motion vector precision of the current block is two or more integer-pel unit, a value obtained by shifting a motion vector difference value by N may be encoded. For example, if a motion vector precision of the current block is two-integer pel, ½ of the motion vector difference value may be encoded/decoded. If a motion vector precision of the current block is 4 integer-pel, ¼ of the motion vector difference value may be encoded/decoded. In this case, the decoder may derive the motion vector of the current block by scaling the decoded motion vector difference value according to the motion vector precision of the current block.

When a merge mode or a skip mode is applied to the current block and a motion vector precision is variably determined for each block, there may be occurred that a motion vector precision of a spatial/temporal merge candidate block is different from a motion vector precision of the current block. Accordingly, a motion vector of the spatial/temporal neighboring block may be scaled according to the motion vector precision of the current block S2820, and the scaled motion vector may be set as the motion information of the spatial/temporal merge candidate S2830. For example, a scaled motion vector mxLXscale[0] and/or mvLXscale[1] is derived by scaling a motion vector mvLX[0] and/or mvLX[1] of a spatial/temporal neighboring block, and then the scaled motion vector may be set as a motion vector of the spatial/temporal merge candidate.

For example, when a motion vector precision of a neighboring block adjacent to the current block is a quarter pel and a motion vector precision of the current block is an integer pel, a motion vector of a spatial neighboring candidate is set by scaling the motion vector of the neighboring block as shown in Equation 4 below.

mvLXscale[0]=(mvLX[0]>>2)<<2 mvLXscale[1]=(mvLX[1]>>2)<<2     [Equation 4]

In Equation 4, a bit shift value used to scale a motion vector of a neighboring block may be adaptively determined according to a magnification between a motion vector precision of the current block and a motion vector precision of the neighboring block.

As another example, a merge candidate (i.e., a merge candidate selected by a merge index) to be merged with the current block may be selected, and it may be checked whether a motion vector precision of it corresponds to a motion vector precision of the current block. When the motion vector precision of the selected merge candidate does not match with the motion vector precision of the current block, the motion vector of the selected merge candidate may be scaled according to the motion vector precision of the current block.

A motion vector of the current block may be set to be the same as a motion vector (i.e., the scaled motion vector) of a merge candidate selected by index information among merge candidates S2840.

Unlike the example shown in FIG. 28, a merge candidate for the current block may be determined in consideration of a motion vector precision of a spatial/temporal neighboring block. For example, based on a determination of whether a difference or magnification between a motion vector precision of the spatial neighboring block and a motion vector precision of the current block is greater than or equal to a predetermined threshold value, it may be determined whether the spatial/temporal neighboring block can be used as a merge candidate. For example, when the motion vector precision of the spatial merge candidate is two integer-pel and the motion vector precision of the current block is a quarter pel, this may mean that a correlation between two blocks is not huge. Accordingly, the spatial/temporal neighboring block whose a difference or magnification with the motion vector precision of the current block is larger than a threshold value may be set as unavailable as a merge candidate. That is, the spatial/temporal neighboring block can be used as a merge candidate only when a difference between the motion vector precision of the spatial/temporal neighboring block and the motion vector precision of the current block is less than or equal to the threshold value. The spatial/temporal neighboring block that cannot be referred to as a merge candidate may not be added to a merge candidate list.

When a difference or magnification between a motion vector precision of the current block and a motion vector precision of a neighboring block is equal to or less than a threshold value but both precisions are different, a scaled motion vector may be set as a motion vector of a merge candidate or a motion vector of the merge candidate specified by a merge index may be scaled as in the embodiment described above with reference to FIG. 28.

A motion vector of the current block may be derived from a motion vector of a merge candidate added to a merge candidate list. If a motion vector precision of the current block and a motion vector precision of the merge candidate added to the merge candidate list are different, a motion vector precision difference value may indicate a difference between motion vector precisions, or may indicate a difference value between corresponding values corresponding to motion vector precisions. Here, the corresponding value may indicate an index value corresponding to a motion vector precision as illustrated in Table 5, or may indicate a value assigned to each motion vector precision as illustrated in Table 6. For example, in Table 6, since a corresponding value assigned to a quarter pel is 2 and a corresponding value assigned to an integer pel is 3, the difference value of both precisions may be determined as 2.

TABLE 6

| Motion vector precision unit | Corresponding value |
| --- | --- |
| Octo pel pixel unit | 0 |
| Quarter pel pixel unit | 1 |
| Half pel pixel unit | 2 |
| Integer pel pixel unit | 3 |
| Two integer-pel pixel unit | 4 |
| Four integer-pel pixel unit | 5 |

Figure 29:
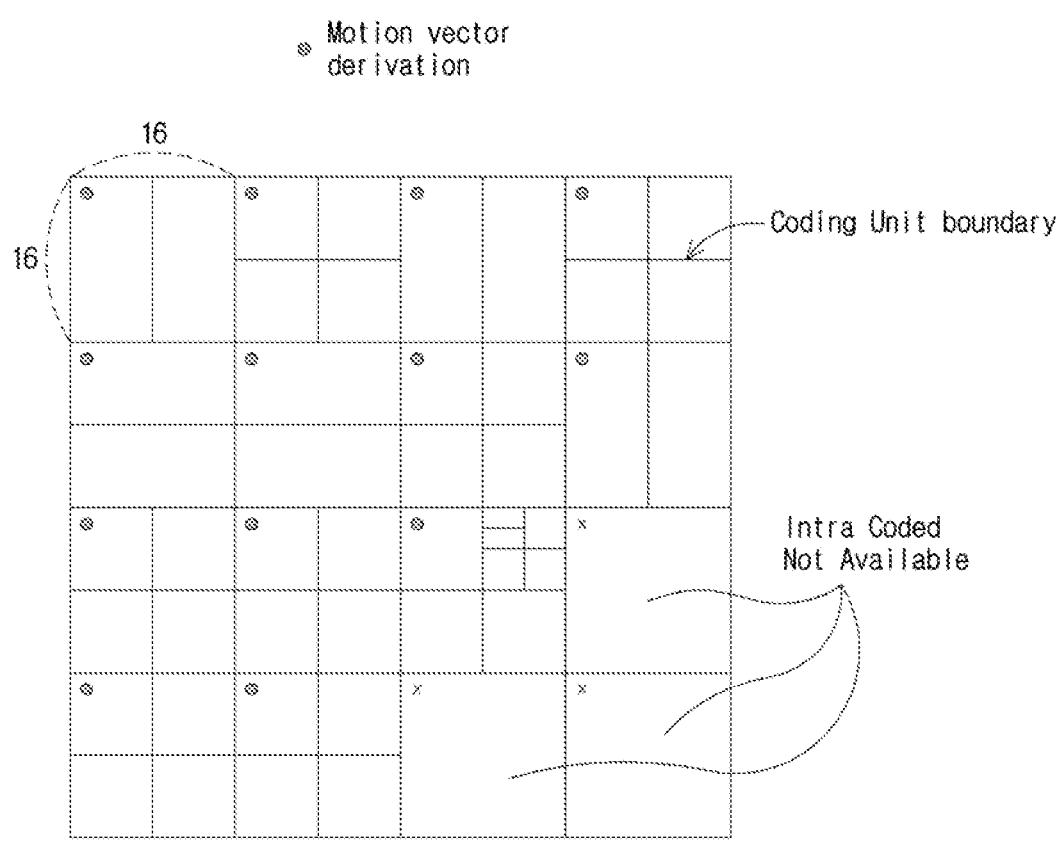
FIGS. 29 and 30 are diagrams for explaining a method of deriving a temporal motion vector (temporal MV) in a plurality of motion vector units.
Figure 30:
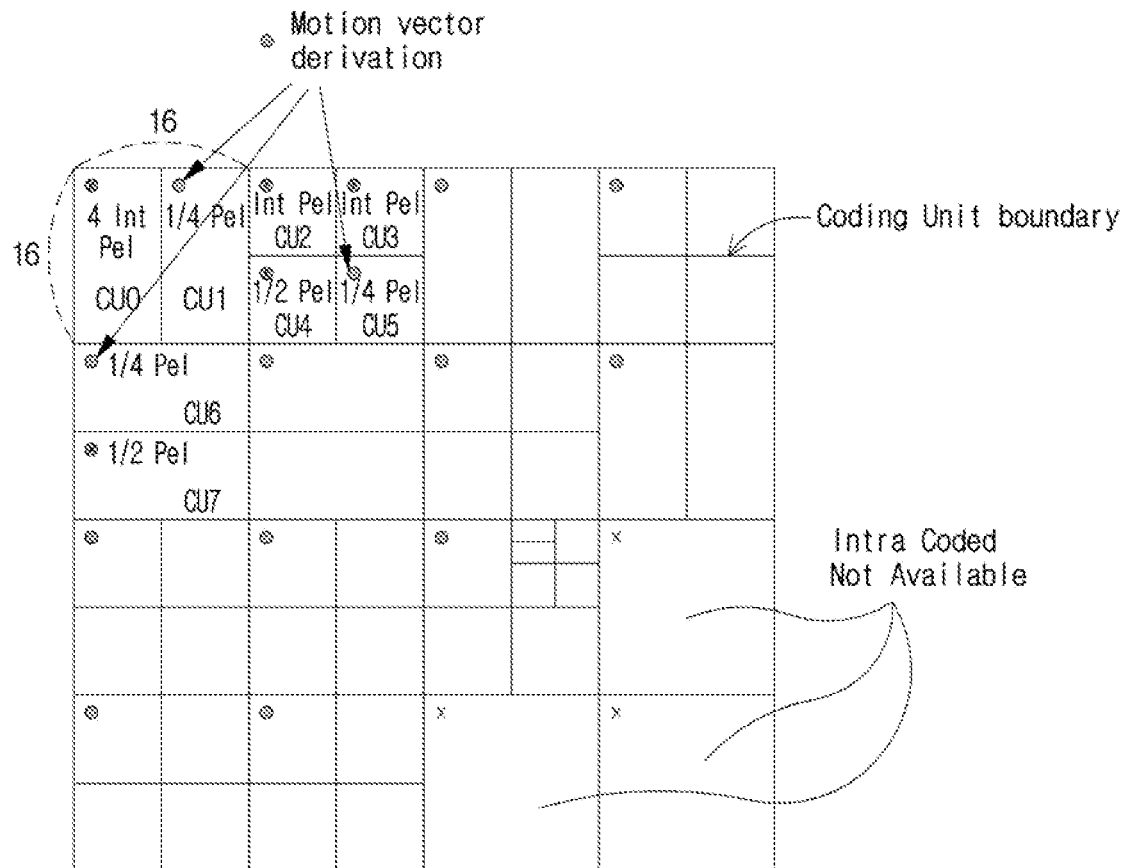

Availability of a temporal spatial neighboring block may be determined by using a motion vector precision magnification instead of a motion vector precision difference value. Here, the motion vector precision magnification may represent a ratio between both motion vector precisions. For example, a magnification between a quarter pel and an integer pel may be defined as 4. FIGS. 29 and 30 are diagrams for explaining a method of deriving a temporal motion vector (temporal MV) in a plurality of motion vector units.

A motion vector used in a previous picture may be used as a motion vector candidate in a merge mode or an advanced motion vector predictor (AMVP) mode. For this purpose, a motion vector may be stored in a unit of N×M size. A motion vector derived from a pre-defined region of N×M size is referred to as a temporal representative motion vector. The temporal representative motion vector may be used as a temporal MV of another picture.

Here, N and M may be a constant of 4, 8, 16, 32 or more, and N and M may be the same or may be different from each other. The N×M size may be a fixed value applied to the entire video sequence or may be differently defined for each unit of a picture, slice, tile, or the like. To this end, the encoder can determine an optimal N×M size and encode it. When there are a plurality of motion vectors within a pre-defined area unit, all of motion vectors may be stored, or only a part of them may be selectively stored. One of all motion vectors may be stored as a representative motion vector, and the representative motion vector may be a motion vector of a block located at a left-top corner within the pre-defined area unit. However, the present invention is not limited thereto, and the representative motion vector may be a motion vector of a right-top corner block, a left-bottom corner block, a right-bottom corner block, or a block including a center position. Here, the pre-defined area unit is referred to as a motion vector storage basic block.

As shown in FIG. 29, a motion vector of a prediction unit which comprises a top left sample or a motion vector of a coding unit may be stored as a representative motion vector. A size of a motion vector storage basic unit may be selectively used based on a sequence, picture or slice. For example, a motion vector storage basic block of 16×16 size may be used in a picture 0 (a picture whose picture order count (POC) value is 0), and a motion vector storage basic block of 32×32 size may be used in a picture 1 (a picture whose picture order count (POC) value is 1).

When deriving a representative motion vector from a motion vector storage basic unit, the representative motion vector may be derived based on a precision of a motion vector. For example, if there are various motion vector precisions within a motion vector storage basic block as shown in FIG. 30, a motion vector having a most accurate precision (¼ pel is more accurate than ½ pel) may be derived as a representative motion vector.

On the contrary, it is also possible that a motion vector having a least accurate precision (½ pel is less accurate than ¼ pel) may be derived as a representative motion vector. Alternatively, a motion vector of a block having the same motion vector precision as the current CU may be derived as a representative motion vector.

Alternatively, regardless of a motion vector precision of the current CU, only certain motion vector precision previously promised in the encoder/decoder may be used. For example, if the encoder/decoder is promised to store a motion vector with ¼ pel precision as a representative motion vector, a motion vector having ¼ pel precision among a plurality of motion vector precisions included in a motion vector storage basic block may be stored as a representative motion vector. If there are a plurality of motion vectors with ¼ pel precision, storing a representative motion vector may be performed based on a predetermined priority or scanning order.

That is, as described above, a representative motion vector may be stored in consideration of at least one of a position of a block or a motion vector precision in a motion vector storage basic block.

Specifically, for example, as illustrated in FIG. 30, when two coding units CU0 and CU1 included in a top left motion vector storage basic block of 16×16 size have different motion vector precisions, a representative motion vector may be used in consideration of the motion vector precisions of respective coding units. For example, if CU0 has 4 integer-pel pixel unit and CU1 has a quarter pel pixel unit, a motion vector derived from a sample at a top left of CU1 who has a more accurate motion vector precision may be derived as a representative motion vector. That is, it means that a representative motion vector is determined by comparing motion vector precisions of each coding unit in a motion vector storage basic unit rather than deriving a motion vector derived by a top-left sample of the motion vector storage basic unit as the representative motion vector.

In addition, for example, in a 16×16 motion vector storage basic block including CU2, CU3, CU4 and CU5, a motion vector derived from a top left sample of CU5 which has a motion vector of a most accurate precision may be set as a representative motion vector. For example, when CU2 and CU3 has an integer pel pixel unit, CU4 has a half pel pixel unit, and CU5 has a quarter pel pixel unit, a motion vector derived by a top left sample of CU5 who has the most accurate motion vector precision may be derived as a representative motion vector.

Similarly, for example, in a 16×16 motion vector storage basic block including CU6, and CU7, a motion vector derived from a top left sample of CU6 who has a motion vector of a most accurate precision may be set as a representative motion vector.

On the contrary, it is also possible to set a motion vector who has a least accurate precision in a motion vector storage base block as representative motion vector. In this case, in the above example, CU0, CU2 (or CU3) and CU7 can be respectively set as a representative motion vector.

Figure 31:
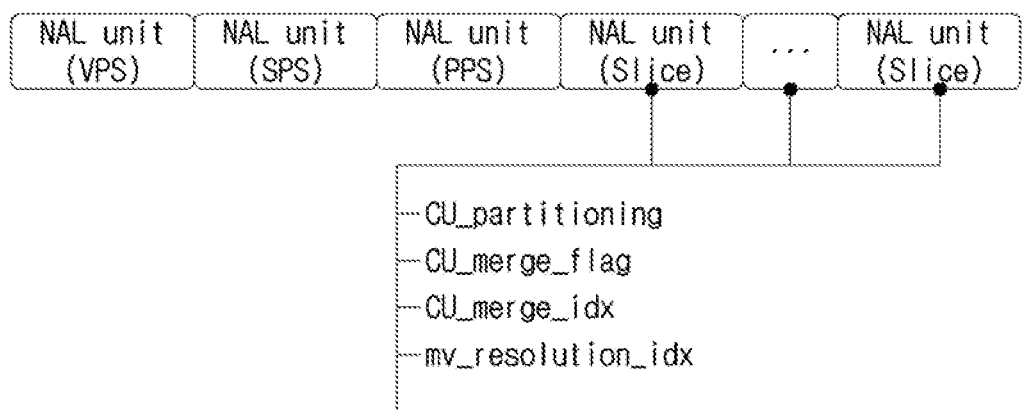
FIG. 31 illustrates, as another embodiment to which the present invention is applied, a syntax element included in a network abstract layer (NAL) applied to an intra prediction sample interpolation.

FIG. 31 illustrates, as another embodiment to which the present invention is applied, a syntax element included in a network abstract layer (NAL) applied to an intra prediction sample interpolation. The NAL unit to which the present invention is applied may include, for example, a video parameter set (VPS), a sequence parameter set (SPS), a picture parameter set (PPS), and at least one slice set (Slice).

For example, it is illustrated in FIG. 31 that a syntax element included in a slice set (SPS), but it is also possible to a sequence parameter set (SPS) or a picture parameter set (PPS) to include the syntax element. In addition, a syntax element to be commonly applied to sequence units or a picture unit may be included in a sequence parameter set (SPS) or a picture parameter set (PPS). On the other hand, a syntax element that is applied only to the slice is preferably included in a slice set (Slice). Therefore, this can be selected in consideration of encoding performance and efficiency.

A syntax element 'CU_partitioning' is information indicating a type of a partitioned coding unit. For example, 'CU_partitioning' may have a predefined codeword value, as shown in Table 3 or Table 4.

In addition, a syntax element 'CU_merge_flag' is information indicating whether a merge between adjacent coding units has been occurred. For example, when 'CU_merge_flag=1', it may be defined as a coding unit in which merge occurs, and when 'CU_merge_flag=0', it may be defined as a normal coding unit in which no merge occurs.

In addition, a syntax element 'CU_merge_idx' is information indicating a shape in which merge occurs in a merge coding unit. That is, for example, if 'CU_merge_idx=0', it may be defined that first two coding units in a coding order are merged, and if 'CU_merge_idx=1', it may be defined that last two coding units in a coding order are merged. In addition, according to the definition between the encoder-decoder, it can be defined that last two coding units in coding order are merged when 'CU_merge_idx=2'.

In addition, a syntax element 'mv_resolution_idx' is index information indicating a precision of a motion vector. For example, a index value of 'mv_resolution_idx' may be defined as shown in Table 5.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method of decoding a video, the method comprising:
performing inter-prediction for a current coding block based on motion information thereof,
determining, based on a first flag of 1-bit, whether to divide the current coding block into two partitions or not;
when it is determined to divide the current coding block, determining, based on a second flag of 1-bit, whether to divide the current coding block symmetrically or asymmetrically; and
determining, based on a third flag of 1-bit, whether to divide the current coding block in a horizontal direction or a vertical direction,
wherein when it is determined to divide the current coding block asymmetrically, the current coding block is partitioned into a first partition that has a ¾ size of the current coding block and a second partition that has a ¼ size of the current coding block, and
wherein locations of the first partition and the second partition in the current coding block are determined based on a fourth flag of 1-bit.

2. The method of claim 1, wherein when it is determined to divide the current coding block in the horizontal direction, based on the fourth flag, it is determined whether the first partition is located at an upper side or a bottom side of the current coding block, and
wherein when it is determined to divide the current coding block in the vertical direction, based on the fourth flag, it is determined whether the first partition is located at a left side or a right side of the current coding block.

3. The method of claim 1, wherein when it is determined to divide the current coding block into the two partitions, decoding a transform skip flag specifying whether an inverse-transform is skipped or not is omitted.

4. The method of claim 3, wherein when decoding the transform skip flag is omitted, skipping the inverse-transform for the first partition or the second partition is not allowed.

5. A method of encoding a video, the method comprising:
performing inter-prediction for a current coding block based on motion information thereof,
encoding a first flag of 1-bit specifying whether the current coding block is divided into two partitions or not;
when the current coding block is divided into two partitions, encoding a second flag of 1-bit specifying whether the current coding block is divided symmetrically or asymmetrically; and
encoding a third flag of 1-bit specifying whether the current coding block is divided in a horizontal direction or a vertical direction,
wherein when the current coding block is divided asymmetrically, the current coding block is partitioned into a first partition that has a ¾ size of the current coding block and a second partition that has a ¼ size of the current coding block, and
wherein a fourth flag of 1-bit which is used to determine locations of the first partition and the second partition in the current coding block is further encoded.

6. The method of claim 5, wherein when the current coding block is divided in the horizontal direction, the fourth flag is used to determine whether the first partition is located at an upper side or a bottom side of the current coding block, and
wherein when the current coding block is divided in the vertical direction, the fourth flag is used to determine whether the first partition is located at a left side or a right side of the current coding block.

7. The method of claim 5, wherein when the current coding block is divided into the two partitions, encoding a transform skip flag specifying whether a transform is skipped or not is omitted.

8. The method of claim 7, wherein when encoding the transform skip flag is omitted, skipping the transform for the first partition or the second partition is not allowed.

9. A non-transitory computer-readable medium for storing data associated with a video signal, comprising:
a data stream stored in the non-transitory computer-readable medium, the data stream being encoded by an encoding method which comprising:
performing inter-prediction for a current coding block based on motion information thereof,
encoding a first flag of 1-bit specifying whether the current coding block is divided into two partitions or not;
when the current coding block is divided into two partitions, encoding a second flag of 1-bit specifying whether the current coding block is divided symmetrically or asymmetrically; and
encoding a third flag of 1-bit specifying whether the current coding block is divided in a horizontal direction or a vertical direction,
wherein when the current coding block is divided asymmetrically, the current coding block is partitioned into a first partition that has a ¾ size of the current coding block and a second partition that has a ¼ size of the current coding block, and
wherein a fourth flag of 1-bit which is used to determine locations of the first partition and the second partition in the current coding block is further encoded.

* * * * *